Patented Mar. 29, 1938

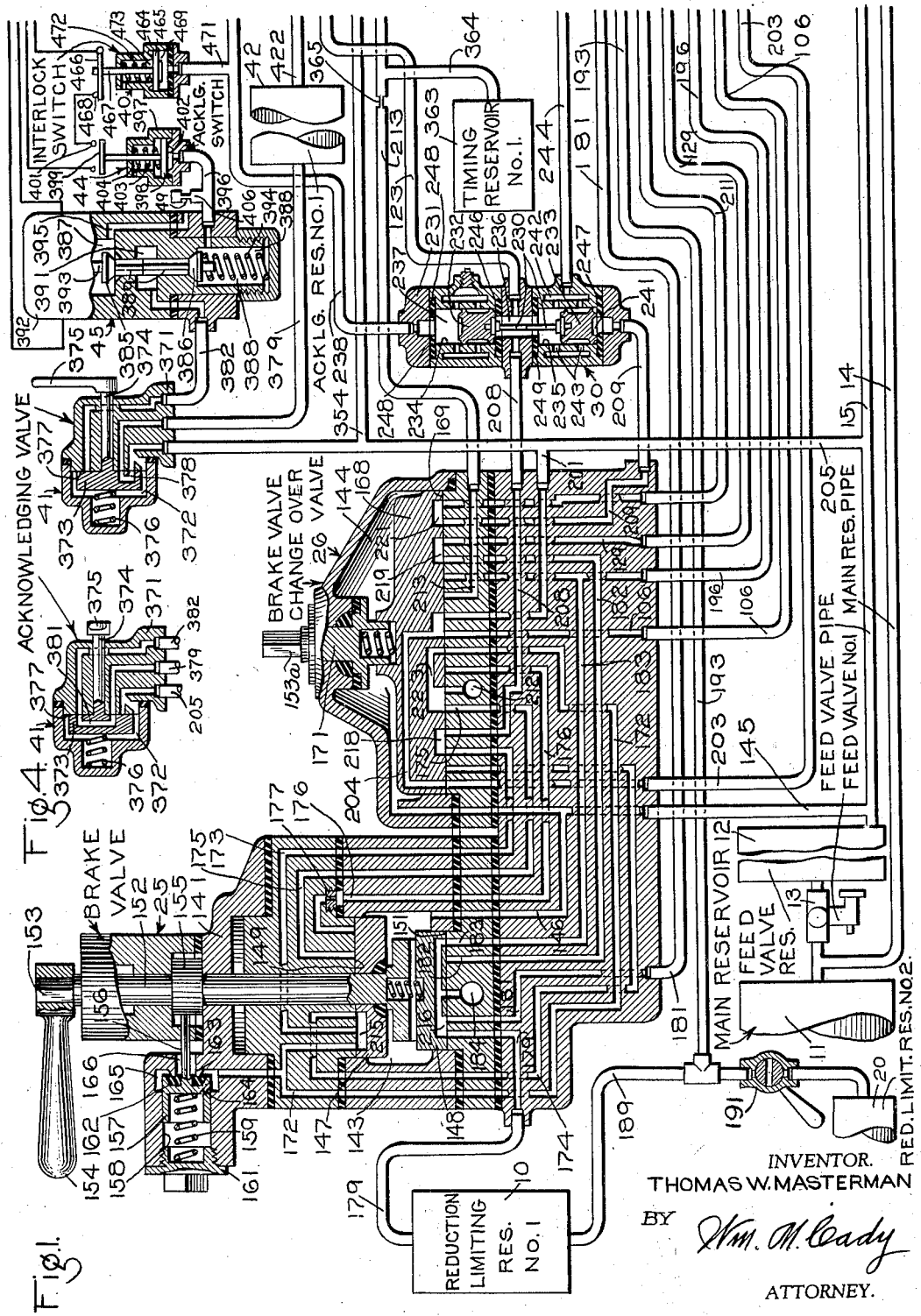

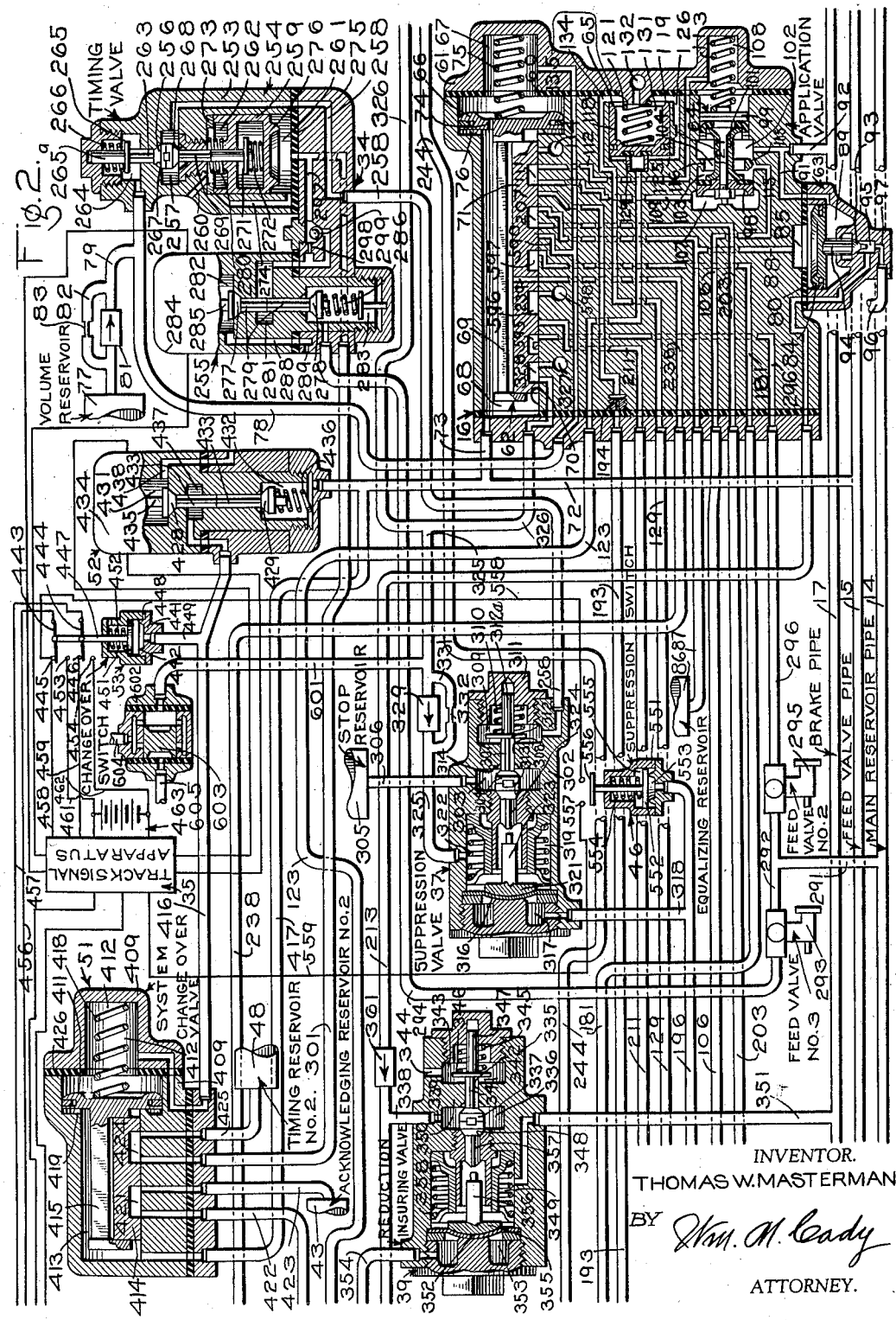

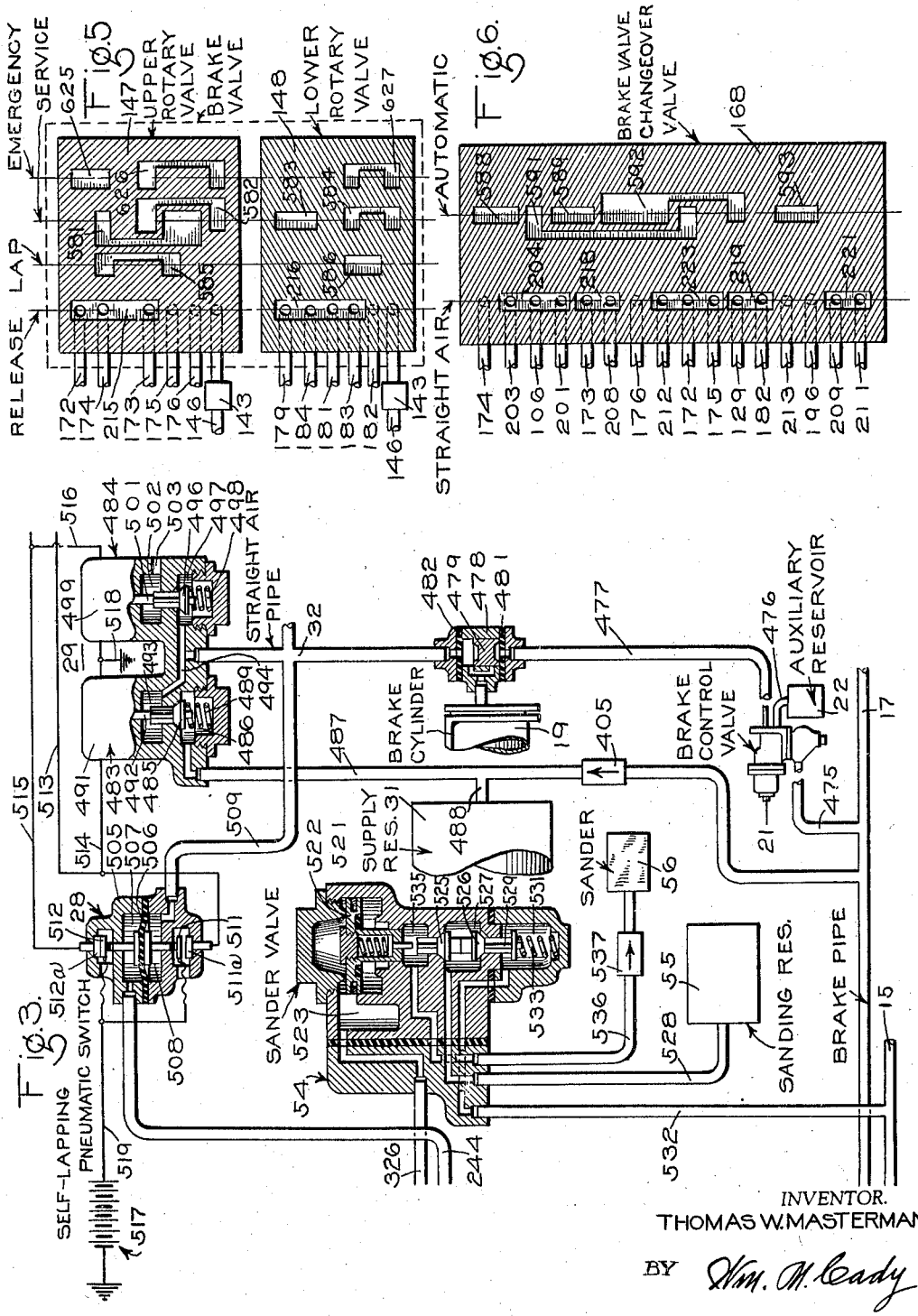

2,112,421

UNITED STATES PATENT OFFICE 2,112,421

AUTOMATIC TRAIN CONTROL EQUIPMENT

Thomas W. Masterman, East McKeesport, Pa., assignor to The Westinghouse Air Brake Company, Wilmerding, Pa., a corporation of Pennsylvania Application August 29, 1936, Serial No. 98,495

25 Claims. (Cl. 303—18)

This invention relates to automatic train control equipment effective to cause application of the brakes on a train responsively to track block signals, and particularly to fluid pressure and electrical brake control equipment for high speed trains, which equipment may effect application of the brakes on the train in response to track block signals received on the train.

My invention is intended to operate in conjunction with some form of apparatus which is responsive to track block conditions for causing a signal or other indication on the train but the particular means whereby the condition of the track blocks is translated to the moving train and whereby a track block signal is given on the train is not a part of my invention. My invention relates rather to the brake control equipment on the train which causes the train control application of the brakes under the control of track block signal responsive apparatus. It will be understood that the term "train control application" as employed herein refers to an application of the brakes initiated automatically in response to track block conditions as distinguished from applications initiated on the train under manual control of the operator.

My invention is embodied in a high speed train brake equipment such as shown, described and claimed in the co-pending application, Serial No. 741,063 of Ellis E. Hewitt, filed August 23, 1934, and assigned to the assignee of the present application. For the sake of simplicity, many details of the brake equipment described in the co-pending application, Serial No. 741,063 are omitted in the description and drawings of the present application, only so much of that brake equipment being shown and described in this application as serves to illustrate the embodiment of my invention therein.

In general, it is an object of my invention to provide a brake control equipment in which the train control applications may be either by so-called automatic operation or by so-called straight-air operation.

It is another object of my invention to provide fluid pressure brake equipment adapted for high speed trains and of the character shown and described in the co-pending application, Serial 741,063, above mentioned, in which the application and release of the brakes may be effected optionally under manual control of the engineman or driver either by automatic operation or by straight-air operation, and in which a train control application is effected either by automatic operation or by straight-air operation dependent upon whether the equipment is conditioned for automatic operation or straight-air operation at the time the train control application is initiated.

Another object is to provide brake control equipment of the character indicated in the foregoing objects and including an application valve device having an equalizing discharge valve for venting the brake pipe and thereby causing application of the brakes by so-called automatic operation, which discharge valve is operatively controlled by a manually operable brake valve device or by train control apparatus responsive to track block conditions.

Another object is to provide brake control equipment of the character indicated in the foregoing objects and including a novel arrangement for suppressing a train control application when manually effecting an application of the brakes by automatic or straight-air operation after the reception of train control signal.

Another object of my invention is to provide fluid pressure brake control equipment of the character referred to in the foregoing objects including means for preventing sliding of the car wheels in the case of train control applications of the brakes by automatic operation.

Another object of my invention is to provide a fluid pressure brake control equipment for a locomotive or similar traction vehicle including means for limiting the brake pipe pressure reduction in train control applications by automatic operation to different pressures, to adapt the equipment on the locomotive for operation in a plurality of different types of service, wherein the cars hauled are provided with different types of brake apparatus.

Another object is to provide brake control equipment which may be conditioned to operate in connection with either of two different standard forms of track signal systems in which corresponding different types of track block responsive signal equipment are employed on the train.

The above objects, and additional and more specific objects of my invention which will be made apparent subsequently, are attained in a fluid pressure brake control equipment which will be described hereinafter and which is illustratively shown in the accompanying drawings, wherein, Figs. 1, 2 and 3 taken together and placed end to end show in diagrammatic form the essentials of a fluid pressure brake control equipment employing my invention, Fig. 4 is a fragmentary sectional view of the acknowledging valve shown in Fig. 1, showing the connections established thereby in the acknowledging position of the valve, Fig. 5 is a diagrammatic view in development form, showing the various pneumatic connections established by the upper rotary valve and the lower rotary valve of the brake valve device shown in Fig. 1, for the various operating positions of the operating handle of the brake valve, and Fig. 6 is a diagrammatic view in development form, showing the pneumatic connections established by the changeover valve of the brake valve device shown in Fig. 1 when the changeover valve conditions the brake valve device for straight-air operation of the brakes and for automatic operation of the brakes.

The embodiment shown in Figs. 1, 2 and 3 taken together represents the equipment for only the control car of the train. However, it will be understood that portions of the equipment shown in Fig. 3 are duplicated on other cars of the train and are controlled and operated in the same manner as is the equipment shown in Fig. 3. Thus, for the purposes of the present application, the equipment will be treated as applying to one car only but it will be understood that the invention is intended to apply to the complete equipment for a train of cars.

*Brief description of equipment*

Referring to Figs. 1, 2 and 3, the equipment shown comprises, briefly, a main reservoir 11 and a so-called feed valve reservoir 12 which is charged with fluid under pressure through a feed valve 13, hereinafter designated feed valve No. 1, the main reservoir 11 being charged with fluid under pressure by a fluid compressor not shown. Extending throughout the train are a main reservoir pipe 14 charged with fluid under pressure directly from the main reservoir 11, and a feed valve pipe 15 charged with fluid under pressure from the feed valve reservoir 12.

An application valve device 16 is provided for controlling the pressure in a brake pipe 17 which extends throughout the length of the train. The control car, as well as each of the other cars, not shown, is provided with one or more brake cylinders, such as the brake cylinder 19, the supply of fluid under pressure to which is under the control of a brake control valve device 21, illustrated for simplicity as a triple valve device of well known construction. An auxiliary reservoir 22 is charged with fluid under pressure from the brake pipe 17 in the usual manner upon an increase in brake pipe pressure under the control of the valve device 21, and upon a reduction in brake pipe pressure the valve device 21 is operated in well known manner to supply fluid under pressure from the auxiliary reservoir to the brake cylinder 19 to effect application of the brakes by so-called automatic operation.

A brake valve device 25 is provided which has a changeover valve device 26 adapted when in one position to condition the brake valve 25 to so control the application valve 16 as to effect application of the brakes by automatic operation. When the changeover valve device 26 of the brake valve 25 is in a second position, the brake valve 25 is conditioned so as to cause application of the brakes by straight-air operation, fluid under pressure being supplied under the control of the brake valve 25 and through a double check valve device 30 to control a self-lapping pneumatic switch 28.

The pneumatic switch 28 controls a magnet valve mechanism 29 on each car, which in turn controls the supply of fluid under pressure from a supply reservoir 31 to a straight air pipe 32, the pressure in the brake cylinder 19 being controlled according to the pressure in the straight-air pipe 32.

The application valve device 16 also functions to effect a train control application of the brakes either by straight-air or by automatic operation, dependent upon the changeover valve device 26 of the brake valve device 25 being in straight-air or automatic position. A timing valve mechanism 34, controlled by a track block signal responsive apparatus 35, hereinafter called the track signal apparatus and indicated in block form, functions to control the operation of the application valve device 16 to cause train control applications of the brakes. A pair of reduction limiting reservoirs, 10 and 20, hereinafter called No. 1 and No. 2 respectively, are associated with the application valve device 16, reduction limiting reservoir No. 2 being cut in or cut out of operation by a manually operated valve 191.

A suppression valve device 37, controlled by brake valve 25, is operative to nullify the effectiveness of the timing valve mechanism 34 to control the operation of the application valve 16, and thereby to suppress a train control application of the brakes, whether the brake valve device 25 is conditioned to effect manual control of the brakes by straight-air operation or by automatic operation.

A reduction insuring valve device 38 is provided which is operative, following the reception of a track block signal, only when a sufficient reduction has been effected in the brake pipe pressure incident to application of the brakes by manual automatic operation, to cause the suppression valve device 37 to suppress a train control application. Upon an insufficient reduction in brake pipe pressure, following the reception of a track block signal, the reduction insuring valve 39 is not operative and consequently causes the suppression valve 37 to be ineffective to continue to suppress a train control application of the brakes.

In order to prevent the operation of the timing valve mechanism 34 upon the reception of a train control or track block signal, without necessitating the application of the brakes by manual operation of the brake valve 25, I provide an acknowledging valve 41. Acknowledging valve 41 is normally in one position, shown in Fig. 1, for causing fluid under pressure to be supplied from the feed valve pipe 15 to a reservoir 42, hereinafter called acknowledging reservoir No. 1 and to a second reservoir 43, hereinafter called acknowledging reservoir No. 2. Upon operation of the acknowledging valve manually from the position shown in Fig. 1 to another or acknowledging position, shown in Fig. 4, fluid under pressure is supplied from acknowledging reservoir No. 1 and acknowledging reservoir No. 2 to a pneumatic switch 44, hereafter called an acknowledging switch, which functions together with the track signal apparatus 35 to prevent the operation of the timing valve mechanism 34 resulting in a train control application of the brakes.

In order to prevent the operation of the acknowledging valve 41 from being effective to prevent the operation of the timing valve mechanism 34 to cause a train control application prior to the reception of a train control signal, I provide an acknowledging cut-off magnet valve device 45 which is under the control of the track signal apparatus 35 and which, in the absence of a track block signal being received by the apparatus 35, is conditioned as shown in Fig. 1 so that if the acknowledging valve 41 is prematurely operated to acknowledging position, fluid under pressure from the acknowledging reservoir No. 1 and acknowledging reservoir No. 2 is vented to atmosphere. Upon the reception of a train control signal by the track signal apparatus 35, the acknowledging cut-off magnet valve device 45 is actuated to establish communication between the acknowledging valve and the acknowledging switch 44, thus rendering the acknowledging valve effective to operate the acknowledging switch only after a train control signal has been received by the track signal apparatus 35.

A pneumatic switch 40, hereinafter called the interlock switch, is provided which is normally closed in series circuit relation with acknowledging switch 44. The interlock switch is actuated to circuit-opening position under the control of application valve device 16 whenever the application valve device 16 is shifted to application position, in order to render the operation of the acknowledging valve device 41 ineffective to prevent a train control application of the brakes going through to completion once the train control application is initiated.

A suppression switch 46 is provided which is effective in cooperation with the track signal apparatus 35 to prevent the operation of the timing valve mechanism 34 to cause a train control application of the brakes if the train is stopped in a danger zone or at a station.

Associated with the timing valve mechanism 34 is a timing reservoir 38, hereinafter designated the timing reservoir No. 2, which functions to delay the operation of the application valve 16 for a predetermined length of time, such as six seconds, from the time that a train control signal is received by the track signal apparatus 35 and accordingly by the timing valve mechanism 34. Thus the engineman has an interval of time after the reception of a train control signal within which to effect a sufficient application of the brakes manually by operation of the brake valve device 25 or to operate the acknowledging valve 41 and thus forestall or prevent the train control application of the brakes.

With the acknowledging valve 41 in the acknowledging position, shown in Fig. 4, fluid under pressure is supplied as previously stated to the acknowledging switch 44 to thereby prevent the operation of the timing valve mechanism resulting in a train control application of the brakes. In order to maintain the engineman on the alert, in the event that he chooses to operate the acknowledging valve to forestall a train control application of the brakes upon the reception of a train control signal instead of operating the brake valve 25 to effect manually either a straight-air or automatic application of the brakes, I provide a timing choke 49 through which the fluid supplied to the acknowledging switch 44 is vented to atmosphere. Thus, unless the engineman repeatedly returns the acknowledging valve to normal position to recharge the acknowledging reservoirs, he is unable to continue to forestall or suppress the operation of the timing valve mechanism 34 to cause a train control application of the brakes.

In order to adapt the brake control equipment for use in connection with different types of track signal systems which may exist on different divisions of the same railroad or on different railroads, I provide a system changeover valve device 51 which is effective in one position to cut in the timing reservoir No. 1 and acknowledging reservoir No. 2. When the system changeover valve device 51 is in a different position, the timing reservoir No. 2 and acknowledging reservoir No. 2 are both cut out and thus the delay time between the reception of the train control signal by the track signal apparatus 35 and the operation of the application valve 16, as determined by the timing valve mechanism 34, that is, the time within which the engineman may act to suppress the train control application of the brakes is reduced, and also the frequency is increased with which the engineman must return the acknowledging valve to its normal position to recharge the acknowledging reservoir No. 1 and thus render the acknowledging switch 44 effective to forestall or suppress operation of the timing valve mechanism 34 resulting in a train control application of the brakes.

A magnet valve device 52 which is controlled by a suitable switch mechanism, not shown, included in the track signal apparatus 35, serves to control the supply of fluid under pressure from the feed valve pipe 15 to the system changeover valve device 51 to cause the valve device to operate to one position or to the other position.

The brake control equipment comprising my invention is adapted to function in connection with a so-called continuous or a so-called intermittent type of track signal system which may be employed on different railway systems or on different divisions of the same railroad. Accordingly, the track signal apparatus 35 includes two different types of equipment (not shown) for translating track block signals to the moving train. In order to adapt the brake control equipment to function in connection with either type of translating equipment in the track signal apparatus 35, I provide a pneumatic changeover switch device 53 to connect one or the other of the translating equipments of track signal apparatus 35 for operation, the switch 53 being operatively controlled by the supply and the release of fluid under pressure thereto in the same manner as the changeover valve device 51, under the control of the magnet valve device 52.

Further equipment may be provided on every car of the train or on only certain cars of the train and includes a sander valve device 54 which is effective to control the charging of a sanding reservoir 55 from the feed valve pipe 16 and also the supply of fluid under pressure from the sanding reservoir 55 to a sander device 56. Operation of the sander valve device 54 is effected under the control of the application valve device 16, the application valve 16 being effective to supply fluid under pressure to the sander valve device 54 to cause operation thereof to supply fluid under pressure to operate the sander 56.

*Detailed description of equipment*

Referring in further detail to the drawings, the application valve device 16 shown in Fig. 2 comprises a sectionalized casing 61 embodying a slide valve device 62, an equalizing discharge valve device 63, a feed valve supply cut-off valve device 64 and an insuring valve device 65 for straight-air operation.

The slide valve device 62 comprises a piston 66 having a chamber 67 at one side thereof and a chamber 68 at the opposite side thereof, the piston 66 having a stem 69 extending into the chamber 68 for operating a slide valve 71 therein on a seat 70. The slide valve chamber 68 is constantly charged with fluid under pressure from the feed valve pipe 15 through a pipe 72 and branch pipe 73, the chamber 67 being charged with fluid under pressure from the chamber 68 through a choke port 74 in the piston 66. A biasing spring 75 interposed in the chamber 67 between the casing and the face of the piston 66, urges the piston 66 in the left-hand direction into contact with a grooved stop shoulder 76, the slide valve 71 being correspondingly shifted into the normal position thereof as shown in Fig. 2. Upon a reduction in pressure of the fluid in piston chamber 67, the piston 66 is shifted by the higher fluid pressure in chamber 68 in the right-hand direction into sealing engagement with a gasket seat 60, the slide valve 71 being correspondingly shifted to application position.

A volume reservoir 77 is provided for enlarging the capacity of the piston chamber 67 and is charged with fluid under pressure from the piston chamber 67 through a pipe and passage 78 which is connected to the timing valve mechanism 34 in the manner hereinafter described, and a branch pipe 79. Contained in the branch pipe 79 is a one-way or check valve 81 which prevents flow of fluid under pressure therepast into the volume reservoir 77 and permits free flow of fluid under pressure in the opposite direction as indicated by the arrow. By-passing the check valve 81 in the pipe 79 is a pipe 82 containing a restricted passage 83 through which fluid under pressure for charging the volume reservoir 77 may be supplied. The slide valve 71 contains various cavities or ports cooperating in the normal and application positions of the slide valve with various atmospheric exhaust passages and other passages, which open at the seat 70, in a manner which will be subsequently made apparent.

The equalizing discharge valve device 63 comprises a piston 84 having on one side thereof an equalizing piston chamber 85 to which an equalizing reservoir 86 is connected through a pipe and passage 87 and branch passage 88, and having at the opposite side thereof a brake pipe chamber 89 which is constantly open to the brake pipe 17 through a passage 91 and a passage and pipe 92. A discharge valve 93 is operated by the piston 84 through the medium of a stem 94 on the piston and is adapted when unseated to open communication between the brake pipe chamber 89 and a chamber 95 which is open to atmosphere through a pipe and passage 96 having a restricted passage 97.

The cut-off valve device 64 comprises two pistons 98 and 99, the piston 98 being slightly larger than the piston 99. The two pistons 98 and 99 are connected by a rigid stem 101 and there is a chamber 102 therebetween to which the brake pipe 17 is connected through the pipe and passage 92. Interposed between the chamber 102 and one face of the piston 98 is a chamber 103 which is open to the chamber 102 through a wide passage 104 and through a choke passage 105. The chamber 103 is supplied with fluid under pressure from the feed valve pipe 15, in the manner hereinafter described, through a pipe and passage 106 which opens into chamber 103. At the outside face of the piston 98 is a chamber 107 which is normally connected to a chamber 108 at the outer face of the smaller piston 99, through a passage 109, a cavity 111 in the slide valve 71 and a passage 112. The piston 98 fits loosely in the bore in which it operates and thus when fluid under pressure is supplied to the chamber 103 from the feed valve pipe 15 and passage 106, fluid under pressure is supplied past the piston 98 into the chamber 107 and thence to the chamber 108 to substantially balance the fluid pressure forces acting on the pistons 98 and 99. A biasing spring 113 interposed in the chamber 108 between the piston 99 and the casing, normally urges pistons 98 and 99 in the left-hand direction to the position shown.

When the slide valve 71 is shifted into application position, as hereinafter described, the cavity 111 in the slide valve connects the passage 112 to an atmospheric exhaust port 114 to vent fluid under pressure from the chamber 108. The pressure of the fluid in the chamber 107 acting on the piston 98 thus becomes effective to overcome the tension of the spring 113 and to thus shift both pistons in the right-hand direction to cause a gasket 115 carried on the right-hand face of the piston 98 to seat in sealing relation on an annular rib seat 116 surrounding the passage 104, to cut off communication from the chamber 103 and the connected feed valve pipe 15 to the chamber 102 except through the choke passage 105.

The insuring valve device 65 of the application valve device 16 comprises a piston valve 118 operating in a bore 119 in the casing 61 and normally biased in the left-hand direction, to cause an annular gasket set in one face of the piston valve to engage an annular rib seat in the form of a bushing 120, by a biasing spring 121 interposed between the opposite face of the piston valve and the casing 61. A pipe and passage 123, through which fluid under pressure is supplied in the manner hereinafter described upon a straight-air application of the brakes by operation of the brake valve 25, opens at the inner seated area of the piston valve 118 within the bushing 120. At the outer seated area of the piston valve 118 is a chamber 125 which is connected to an annular chamber 126 through a choke passage 127, the annular chamber 126 being connected to the brake valve device 25 through a pipe and passage 129. A chamber 131 at the right face of the piston valve 118 is constantly open to atmosphere through an atmospheric port 132 and is connected through a port 134 to the annular chamber 126 when the piston valve 118 is in seated relation on the annular rib seat 120.

When the pressure of the fluid supplied through the pipe and passage 123 to the inner seated area of the piston valve 118 is sufficient to overcome the tension of the spring 121, which pressure may be of the order of forty pounds per square inch, the piston valve 118 is shifted in the right-hand direction to seat on a gasket 135 and close off communication through the port 134 between the chamber 131 and the annular chamber 126. The piston valve 118 is thus unseated from the annular rib seat or bushing 120, and communication is established through which fluid may flow from the pipe and passage 123, through chamber 125, restricted passage 127, and annular chamber 126 to the pipe and passage 129. The function of the insuring valve device 65 will be brought out more clearly in connection with a hypothetical train control application of the brakes by straight-air operation to be described hereinafter.

The brake valve device 25 and its changeover valve device 26 are embodied in a unitary sectionalized casing 141 containing two chambers 143 and 144 which are constantly connected to and charged with fluid under pressure from the feed valve pipe 15 through a passage and pipe 145 and, in the case of the chamber 143, also through a branch passage 146. Contained in the chamber 143 are two rotary valves 147 and 148, the valve 147 cooperating with a valve seat 149 on the casing and being designated hereinafter as the upper rotary valve. The valve 148 cooperates with a valve seat 151 on the casing and is hereafter designated the lower rotary valve. The two rotary valves 147 and 148 are adapted to be operated simultaneously by a rotary stem 152 which extends to the exterior of the casing 141 and has a squared end portion 153 at the end thereof for receiving a removable handle 154.

The operating stem 152 has a cam 155 thereon which cooperates with the projecting stem 156 of a piston valve 157. The piston valve 157 operates slidably in a bore 158 and is yieldingly urged in the right-hand direction by a spring 159 interposed between the one face of the piston valve and a screw plug 161 which closes the open end of the bore 158, to cause an annular gasket 162 on the opposite face of the piston valve to engage an annular seat rib 163. The piston valve 157 may either fit loosely in the bore 158 or it may be provided with a pressure equalizing port 164 for preventing dash-pot action of the piston valve 157. The cam 155 on the operating stem 152 is so designed that only when the operating handle 154 is rotated to emergency position is piston valve 157 unseated from the annular rib seat 163 through the medium of the stem 156 to connect a chamber 165 in the casing to atmosphere through a passage 166. As will be made apparent hereinafter, the piston valve 157 is effective to control operation of the equalizing discharge valve 63 of the application valve device 16 in case of automatic emergency application of the brakes effected by manual operation of the brake valve handle 154.

Contained in the chamber 144 is a rotary valve 168 which is operatively moved through the medium of an operating stem 171 having an exterior squared end portion 153a for receiving the removable handle 154. By providing only the one operating handle 154 which is normally carried on the squared end portion 153 of the operating stem 152, undesired and accidental shifting of the rotary valve 168 is guarded against.

As indicated in Fig. 6 the rotary valve 168 may be positioned in either of two positions, one of which is shown in Fig. 1 and indicated in Fig. 6 and which will hereinafter be called the straight-air position, and the other of which is merely indicated in Fig. 6 and which will hereinafter be called the automatic position. With the rotary valve 168 in its straight-air position, operation of the operating handle 154 of the brake valve 25 into service or emergency position causes application of the brakes by straight-air operation. With the rotary valve 168 in its automatic position, operation of the operating handle 154 to service or emergency position causes application of the brakes by automatic operation, that is, by controlling the pressure in the brake pipe 17.

Contained in the casing 141 of the brake valve device 25 are a plurality of passages 172, 173, 174, 175 and 176, one end of each passage opening at the valve seat 149 for the upper rotary valve 147, and the opposite end opening at the valve seat 169 for the rotary valve 168 of the changeover valve device 26. The passage 176 contains a choke 177 for a purpose which will hereinafter be made apparent.

Opening at the seat 151 of the lower rotary valve 148 are a plurality of ports and passages 179, 181, 182, 183 and an atmospheric exhaust port 184. The passage 179 is connected to a pipe 179 leading to reduction limiting reservoir No. 1. When the manually operable valve 30 is operated from the closed position shown, to the open position it establishes communication through a pipe 189 whereby the reduction limiting reservoir No. 2 is connected to the reduction limiting reservoir No. 1. The function and the purpose of reduction limiting reservoirs No. 1 and No. 2 will be explained hereinafter. Connected to the pipe 189, between reduction limiting reservoir No. 1 and the valve 30, is a pipe and passage 193 which opens at the seat 70 of the slide valve 71 of the application valve device 16, the passage 193 containing a choke 194 for a purpose which will hereinafter made apparent.

The passage 181 is connected to a pipe and passage 181 which opens at the seat 70 of the slide valve 71 of the application valve device 16.

The passage 182 leads to and opens at its opposite end at the seat 169 for the rotary valve 168 of the changeover valve device 26. The passage 183 opens into a passage and pipe 196 leading to and opening at the seat 169 for the rotary valve 168 and to the suppression valve 37 and suppression switch 46.

In addition to the ports and passages already mentioned which open at the seat 169 of the rotary valve 168, a pair of ports and passages 201 and 203 and the passage and pipe 106 leading from the application valve device 16 open at the seat 169 and are connected in the straight-air position of the valve 168 by a passage 204 in the rotary valve 168. Passage 201 is connected by a pipe 201 to a branch pipe 205 opening out of feed valve pipe 15. The passage 106, as previously described, leads to the application valve device 16 and opens into the chamber 103 of the cut-off device 64 thereof. The passage 203 is connected to a pipe and passage 203 which opens at the seat 70 of the slide valve 71 of the application valve device 16, the passage 203 being connected by a cavity 207 in the slide valve 71 to passage and pipe 87 leading to equalizing reservoir 86.

Also opening at the seat 169 of the rotary valve 168 are two passages 208 and 209 which are connected respectively to pipes 208 and 209 leading to different chambers in the double check valve 30 as will be described hereinafter. A passage and pipe 211 opens at one end at the valve seat 169 of the rotary valve 168 and at the opposite end at the valve seat 70 for the slide valve 71 of the application valve device 16. The pipe and passage 129 which is connected at one end to the annular chamber 126 of the insuring valve device 65 of the application valve device 16 is open at its opposite end at the valve seat 169 of the rotary valve 168.

Also opening at the seat 169 of the rotary valve 168 are an atmospheric exhaust port 212 and a port and passage 213, the purpose of which will be made clear hereinafter.

As will be seen in Figs. 1 and 5, the upper rotary valve 147 of the brake valve device 25 is provided with a cavity 215 which connects the three ports and passages 172, 173 and 174 in the release position of the operating handle 154, the ports and passages 175 and 176 being blanked at the seat 149 of the rotary valve 147.

The lower rotary valve 148 has a cavity 216 which, in the release position of the operating handle 154, connects the ports and passages 179, 181 and 183 to the exhaust passage or port 184, the port and passage 182 being blanked or closed at the seat 151 of rotary valve 148.

As will be seen by referring to Figs. 1 and 6, the rotary valve 168 is provided with a plurality of cavities 218, 219 and 221, the cavity 218 being effective in the straight-air position of the rotary valve 168 to connect the passage 173 to the passage 208, the cavity 219 being effective in the straight-air position of the rotary valve 168 to connect the passage 182 to the passage 129, and the cavity 221 being effective in the straight-air position of the rotary valve 168 to connect the passage 209 to the passage 211. In addition to the passage 204, previously described which connects the passage 201 to the passages 106 and 203 in the straight-air position of the rotary valve 168, the rotary valve 168 is also provided with a passage 223 which, in the straight-air position of the rotary valve 168, connects the passages 172 and 175 to the atmospheric exhaust port 212.

The double check valve device 30 comprises a sectionalized casing 231 containing two double check valves 232 and 233 in the form of pistons which operate in bores 234 and 235 respectively. Each of the valve pistons 232 and 233 is provided with a stem 230, the two stems extending into a passage 236 joining the bores and being adapted to meet therein in end-to-end contact. At the side of the valve piston 232 opposite to the passage 236 is a chamber 237 to which is connected a pipe and passage 238, the passage 238 opening at the seat 70 of the slide valve 71 of the application valve device 16 and being supplied with fluid under pressure from the slide valve chamber 68 through a port 239 in the slide valve 71 when the slide valve is in its normal position shown in Fig. 2. To the chamber or passage 236 of the double check valve device 30 are connected the pipe and passage 208 leading from the seat 169 of the rotary valve 168, and the pipe and passage 123 which opens at the opposite end at the inner seated area of the piston valve 118 of the insuring valve device 65 of the application valve device 16.

On the side of the valve piston 233 opposite to the passage 236 is a chamber 241 to which is connected the pipe and passage 209 leading from the seat 169 of the rotary valve 168. Surrounding the bore 235 is an annular chamber 242 which is connected to the bore 235 at opposite ends through a plurality of ports 243.

To the chamber 242 is connected one end of a pipe 244, hereinafter called the control pipe, the opposite end of which pipe is connected to the self-lapping pneumatic switch 28.

The pressure of the fluid in the chamber 237 urges the valve piston 232 into seated relation on an annular gasket 246 and at the same time causes the stem 230 on the valve piston 232 to engage the stem 230 on the valve piston 233 and shift the valve piston 233 into sealing engagement with an annular gasket 247. Communication is accordingly established from the pipe 208 and central passage 236 in the check valve 30 to the annular chamber 242 and control pipe 244.

When the pressure of the fluid in the chamber 241 is sufficiently greater than the pressure in the chamber 237 both valve pistons 232 and 233 are shifted upwardly, the valve piston 232 into sealing engagement with an annular gasket 248 and the valve piston 233 into sealing engagement with an annular gasket 249. In the latter position of the valve piston 233, communication from the pipe 208 and passage 236 to the annular chamber 242 and the control pipe 244 is cut off while communication is established from the pipe 209 to the annular chamber 242 and control pipe 244.

Timing valve mechanism 34 comprises a casing 253 containing a pneumatic valve device 254 and a magnet valve device 255. The pneumatic valve device 254 comprises a double beat valve 256 contained in a chamber 257 which is connected to the suppression valve device 37 through a passage and pipe 258, the valve 256 being operated by a piston 259 which has a pressure chamber 261 at one side thereof and an atmospheric chamber 262 at the other side thereof which is open to atmosphere through a port 260. On one side the double beat valve 252 has a fluted stem 263 which extends into a chamber 264 to which the pipe 78 leading from the piston chamber 67 of the application valve device 16 is connected. A biasing spring 266 acts on the end of stem 263 through a flange 265 on a pin 265a to yieldingly urge the valve 256 away from an upper valve seat 267 into seated engagement on a lower valve seat 268.

The opposite side of the double beat valve 256 has a fluted stem 269 which extends into the chamber 262, and carries a collar 271 fixed thereto, a spring 272 being interposed between the collar 271 and the piston 259 for yieldingly urging the stem 269 relative to the piston to seat the double beat valve 256 on its upper seat when the piston is in its upper position and for yieldingly permitting the relative movement between the piston 259 and the stem 269 after the double beat valve 256 is seated on the upper seat 267 to thus permit the upper edge of the piston 259 to engage in sealing relation on an annular gasket seat 273. A spring 280 interposed between the casing and the piston 259 yieldingly urges the piston downwardly to cause an annular rib 276 on the lower face of the piston to engage a gasket seat 275 in sealing relation when fluid under pressure is released from the chamber 261, the spring 266 being at the same time effective to urge the double beat valve 256 away from the upper valve seat 267, to open communication from the chamber 264 to the chamber 257 and pipe and passage 258, and into seated engagement on a lower valve seat 268 to cut off communication between the chamber 257 and the atmospheric chamber 262. A passage 274 is provided which connects the outer seated area of piston 259, when seated on gasket 275, with the atmospheric chamber 262. When the piston is in its upper position seated on the gasket seat 273, it closes the passage 274.

The supply and the release of fluid under pressure to and from the chamber 261 of the pneumatic valve device 254 is under the control of the magnet valve device 255. The magnet valve device 255 comprises a pair of oppositely seating valves 277 and 278 having fluted stems 279 which meet in end-to-end contact within a chamber 281 intermediate the chambers 282 and 283 within which the valves 277 and 278 are respectively contained. An electromagnet 284 is effective, when energized, to act through the medium of a plunger or stem 285 to shift the valves 277 and 278 into seated and unseated positions, respectively, against the force of a biasing spring 286 acting within the chamber 283 on the valve 278. When the electromagnet 284 is deenergized, the spring 286 is effective to yieldingly urge the valves 277 and 278 into unseated and seated positions respectively.

The chamber 282 is constantly connected to atmosphere through a passage 288 and a choke port 289. The chamber 283 is constantly charged with fluid under pressure from the main reservoir pipe 14 through a branch pipe 291, a pipe 292, a feed valve device 293, hereinafter called feed valve No. 3 and a pipe 294. The feed valve No. 3 regulates the pressure suplied into the pipe 294 to any desired value, such as forty-five pounds per square inch. Another feed valve device 295 hereinafter called feed valve No. 2 functions to regulate to a certain uniform pressure, such as sixty pounds per square inch, the supply of fluid under pressure from the main reservoir pipe 14 and pipes 291 and 292 to a pipe and passage 296, the passage 296 opening at the seat 70 of the slide valve 71 of the application valve device 16. The chamber 281 of the magnet valve device 255 is connected to the chamber 261 of the pneumatic valve device 254 by a passage 297 containing, in parallel relation, a choke passage 298 and a non-return or check valve 299 of the ball type.

The timing reservoir No. 2 is connected to or cut off from a pipe and passage 301 opening into the chamber 261 of the pneumatic valve device 254, under the control of the system changeover valve device 51, in the manner to be hereinafter more specifically described.

The check valve 299 enables rapid flow from the chamber 281 of the magnet valve device 255 to the chamber 261 and prevents reverse flow of fluid under pressure therepast, the rate of flow of fluid under pressure from the chamber 261 and its connected timing reservoir No. 2 being determined by the size of the choke passage 298.

When the electromagnet 284 of the magnet valve device 255 is energized and the valves 277 and 278 are actuated to their seated and unseated positions respectively, as shown in Fig. 2, fluid under pressure is supplied from the supply pipe 294 past the unseated valve 278 to chamber 281 and thence through the passage 297 past the check valve 299 and to chamber 261 and its connected timing reservoir No. 2, the pressure of the fluid in the chamber 261 being effective to seat the double beat valve 256 on its upper seat 267. When the electromagnet 284 of the magnet valve device 255 is deenergized and the valves 277 and 278 accordingly shifted to unseated and seated positions respectively by the spring 286, the supply of fluid under pressure from the supply pipe 294 is cut off by the valve 278 and communication is established past the unseated valve 277 through which fluid under pressure is vented from the chamber 261 and its connected timing reservoir No. 2 through the passages 301 and 297, choke passage 298, chamber 281, chamber 282, passage 288 and choke port 289.

The suppression valve device 37 comprises a casing 302 having a chamber 303 containing a double beat valve 304 and constantly connected to a reservoir 305, hereinafter called the stop reservoir, through a pipe and passage 306. The double beat valve 304 has a fluted stem 307 which operates slidably in a bore 308 and extends into a chamber 309 to which the pipe and passage 258 from the timing valve mechanism is connected. A biasing spring 310, interposed in the chamber 309 between a screw plug 311 closing the end of the chamber 309 and a collar or flange 312 fixed to a slidable pin or stem 312a, yieldingly urges the double beat valve 304 normally in the left-hand direction into seated engagement on a valve seat 313 and unseats the valve 304 from a valve seat 314 to establish communication through which fluid under pressure, supplied into the pipe 258 under the control of the timing valve mechanism 34, may flow through the chamber 309, bore 308, chamber 303, pipe and passage 306 to the stop reservoir 305.

The casing 302 of the suppression valve device 37 further contains a movable abutment, such as the diaphragm 316, which has a chamber 317 at one side thereof constantly connected through a branch pipe and passage 318 to the pipe 196, leading from the brake valve device 25 and hereafter designated the suppression pipe. At the opposite side of the diaphragm 316 is a chamber 319 which contains a follower 321 associated with the diaphragm 316 and a coil spring 322 which is interposed between the follower 321 and the casing 302 to yieldingly urge the diaphragm 316 in the left-hand direction.

When fluid under pressure is supplied to the chamber 317, through the suppression pipe 196 and its branch pipe 318, in the manner to be hereinafter described, the diaphragm 316 is urged in the right-hand direction against the force of the spring 322, and a stem 323 of the diaphragm follower 321 engages in end-to-end contact the fluted stem 324 of the double beat valve 304 and shifts the double beat valve 304 against the tension of the spring 310 into seated engagement with the valve seat 314 to cut off communication between the pipe 258 and the stop reservoir 305. At the same time, communication between the stop reservoir 305 and chamber 319 is established past the open valve seat 313 from which the double beat valve 304 is unseated.

Chamber 319 of the suppression valve device 37 is connected by a branch pipe 325 to a pipe and passage 326 which opens at the seat of the slide valve 71 of the application valve device 16 and which in the normal position of the slide valve 71 is connected to an atmospheric exhaust port 327 opening at the seat of the slide valve 71, through a cavity 328 in the slide valve 71. The pipe 325 contains a non-return or check valve 329 which permits flow of fluid under pressure therepast only in the direction indicated by the arrow and which prevents reverse flow of fluid under pressure therepast from the suppression valve device 37 to the application valve device 16. A by-pass communication 331 around the check valve 329 contains a restricted passage 332 which permits flow of fluid under pressure from the stop reservoir 305 and the chamber 319 at a relatively low rate to the seat of the slide valve 71 and thence to atmosphere through the port 327.

Since fluid under pressure is vented from the piston chamber 67 of the application valve device 16 and the connected volume reservoir 77 whenever the timing valve mechanism 34 is operated to establish communication past the valve seat 267 of the double beat valve 256, which reduction in fluid under pressure is effective to cause the piston 66 and its associated slide valve 71 to be actuated in the right-hand direction to produce a train control application of the brakes in the manner to be described hereinafter, it will be apparent that if the double beat valve 304 of the suppression valve device 37 is actuated into seated relation on the valve seat 314 to cut off the stop reservoir 305 from the pipe 258, then the reduction of pressure in the piston chamber 67 of the application valve device which is effected is insufficient to actuate the piston and slide valve in the right-hand direction to produce a train control application of the brakes.

The reduction insuring valve device 39 comprises a casing 335 having a chamber 336 conobtaining a constant and shortest legal travel time of the rotary heat valve which leads to a choke connected device 385 and 386 into unseated and seated positions respectively, the chamber 391 and the connected pipe and passage 382 being accordingly vented to atmosphere past the unseated valve 385 and through the atmospheric passage 395, while the connection between the chamber 391 and the chamber 388 is cut off by the seated valve 386.

When the electromagnet 392 is energized and the valves 385 and 386 accordingly actuated to seated and unseated positions respectively, the connection from the chamber 391 and the connected pipe and passage 382 to the atmosphere is cut off by the seated valve 385 and communication is established from the chamber 391 past the unseated valve 386 to the pipe and passage 396 leading to the acknowledging switch 44.

The acknowledging switch 44 may be of any suitable construction and is illustrated as comprising a casing 397 containing a piston 398 for actuating a contact bridging member 399 into engagement with a pair of stationary contact members 401 upon the supply of fluid under pressure from pipe 396 to a chamber 402 at one side of the piston 398. A biasing spring 403 acting within a chamber 404 at the opposite side of the piston shifts the piston so as to separate the contact member 399 from the contact members 401 when fluid under pressure is released from the chamber 402. The tension of the spring 403 is such that a certain low uniform degree of fluid pressure, such as two or three pounds per square inch, is sufficient to overcome the spring and move the piston to shift the contact member 399 into circuit-closing position.

The pipe 396 connecting the magnet valve device 45 and the acknowledging switch 44 has a branch pipe 406 connected thereto which is open to atmosphere through a choke passage 49.

The cooperative relation of the acknowledging valve 41, acknowledging cut-off magnet valve device 45 and the acknowledging switch 44 should now be clear. It will be seen that if the electromagnet 392 of the magnet valve device 45 is deenergized, as it normally is with the equipment conditioned as shown, operation of the handle 375 of the acknowledging valve 41 to acknowledging position is merely effective to vent the fluid under pressure from the acknowledging reservoirs No. 1 and No. 2 to atmosphere through the pipe and passage 379, passage 381 in the rotary valve 372 of the acknowledging valve 41, passage and pipe 382, chamber 391 of the magnet valve device 45, past the unseated valve 385, through chamber 387 and passage 395. On the other hand, if the electromagnet 392 of the magnet valve device 45 is energized when the operating handle 375 of the acknowledging valve device 41 is operated to acknowledging position, fluid under pressure is supplied from the acknowledging reservoirs No. 1 and No. 2 to the chamber 391 of the magnet valve device 45 as previously traced, and thence past the unseated valve 386 through chamber 388 and pipe 396 to the chamber 402 of the pneumatic acknowledging switch 44 to actuate contact member 399 into circuit-closing position in engagement with the contact members 401. However, since the pipe 396 and the connected chamber 402 of the acknowledging switch 44 is open to atmosphere through the choke passage 49, the pressure in the chamber 402 of the acknowledging switch 44 will, after a predetermined time which is dependent on the capacity of the acknowledging reservoirs No. 1 and No. 2 and the size of the choke passage 49, sufficiently reduce the pressure so that the biasing spring 403 of the acknowledging switch 44 effects separation of the contact member 399 from the contact members 401. If it is desired, therefore, to maintain the contact member 399 of acknowledging switch 44 in circuit-closing position, it is necessary to momentarily return the operating handle 375 of the acknowledging valve 41 to its normal position for effecting recharge of the acknowledging reservoirs No. 1 and No. 2, and then return the operating handle 375 to the acknowledging position again. It will be understood that the acknowledging reservoirs No. 1 and No. 2 may be recharged more rapidly than the pressure in the chamber 402 of the acknowledging switch 44 can be reduced through choke 49 and therefore that it is possible by a so-called fanning or repeated operation of the operating handle 375 of the acknowledging valve device 41 to its normal charging position from the acknowledging position, to indefinitely maintain the acknowledging switch 44 in circuit-closing position.

As previously explained, the time interval which elapses from the reception of a track signal by the track signal apparatus 35 and the consequent deenergization of the electromagnet 284 of the magnet valve device 55 of the timing valve mechanism 34, to the operation of the pneumatic valve device 254 to vent fluid under pressure from the piston chamber 67 of the application valve device 16 to the pipe and passage 258 and eventually to the stop reservoir 305, is dependent upon the volume of the timing reservoir No. 2 and the size of the choke passage 298. Furthermore, as just described, the frequency with which the operator must return the operating handle 375 of the acknowledging valve to its normal charging position from acknowledging position in order to maintain the acknowledging switch 44 in circuit-closing position depends upon the capacity of the acknowledging reservoirs No. 1 and No. 2. If, therefore, it is desired to increase the frequency with which the operator must operate the operating handle 375 of the acknowledging valve 41 in order to maintain the acknowledging switch 44 in circuit-closing position, the capacity of the acknowledging reservoir must be reduced.

In order, therefore, to provide for increasing the frequency of operation of the operating handle 375 of the acknowledging valve device 41 to maintain the acknowledging switch 44 in circuit-closing position and in order to reduce the time delay from the reception of a track signal by the timing valve mechanism 34 to the operation of the pneumatic valve device 254 thereof to vent fluid under pressure to stop reservoir 305, I provide according to my invention, a system changeover valve device 51.

The system changeover valve device 51 comprises a casing 409 containing a piston 411 having a piston chamber 412 at one side thereof and a slide valve chamber 413 at the opposite side thereof containing a slide valve 414 which is operative by movement of the piston 411 through the medium of a stem 415 of the piston 411.

The piston chamber 412 is supplied with fluid under pressure through a pipe and passage 416 connected to the changeover magnet valve device 52, the magnet valve device 52 being operative to control the supply of fluid under pressure from the feed valve pipe 15 to the pipe and passage 416 and the piston chamber 412 and the release of fluid under pressure from the piston chamber 412 to atmosphere in the manner to be presently described. The slide valve chamber 413 is constantly connected to and charged with fluid under pressure from the feed valve pipe 15 through a pipe and passage 417 which is connected to the branch pipe 72 of the feed valve pipe 15.

With equal fluid pressures in chambers 412 and 413 on opposite sides of the piston 411, a biasing spring 418, contained in the piston chamber 412 and interposed between the casing and the piston 411, urges the piston in the left-hand direction into engagement with a stop shoulder 419, the slide valve 414 being accordingly shifted into the position shown in Fig. 2 wherein a cavity 421 in the slide valve connects a pipe and passage 422 leading from acknowledging reservoir No. 1 to a passage and pipe 423 leading to acknowledging reservoir No. 2 and wherein a cavity 424 in the slide valve 414 connects pipe and passage 301 which leads out of the piston chamber 261 of the pneumatic valve device 254 of the timing valve mechanism 34 to a pipe and passage 425 leading to timing reservoir No. 2.

Upon a reduction in the pressure in the piston chamber 412, the higher pressure in the slide valve chamber 413 shifts the piston 411 in the right-hand direction against the tension of the biasing spring 418 into sealing engagement with a gasket 426, the slide valve 414 being accordingly shifted to a position in which the connection between acknowledging reservoir No. 1 and acknowledging reservoir No. 2 is cut off and the connection between the venting pipe and passage 301 and the timing reservoir No. 2 is cut off.

Changeover magnet valve device 52 comprises a pair of oppositely seating valves 428 and 429 contained in chambers 431 and 432 respectively and having fluted stems 433 which meet in end-to-end contact. An electromagnet 434 is provided which is effective when energized to actuate a plunger or stem 435 to engage the valve 428 and simultaneously shift the valves 428 and 429 to seated and unseated positions respectively against the force of a biasing spring 436 contained in the chamber 432 and acting on the valve 429. A chamber 437, intermediate the two chambers 431 and 432 and to which is connected the pipe and passage 416 leading from the system changeover valve device 51, is supplied with fluid under pressure past the unseated valve 429 from the chamber 432 which is constantly connected to the feed valve pipe 15 through the branch pipe 72.

When the electromagnet 434 is deenergized, spring 436 shifts the valves 428 and 429 to unseated and seated positions respectively. Valve 429 thus cuts off the supply of feed valve pressure from the chamber 432 to the chamber 437, and the valve 428 opens communication from the chamber 437 to the chamber 431 which is constantly open to atmosphere through an atmospheric passage 438.

Thus, when the changeover magnet valve device 52 is energized fluid under pressure is supplied from the feed valve pipe 15 to the piston chamber 412 of the changeover valve device 51 to operate it to the position shown wherein acknowledging reservoirs No. 1 and No. 2 and timing reservoir No. 2 are cut in for operation. When the changeover magnet valve device 52 is deenergized, piston chamber 412 of the changeover valve device 51 is vented to atmosphere and the slide valve 414 is accordingly operated to cut out of operation the acknowledging reservoir No. 2 and the timing reservoir No. 2.

The track signal apparatus 35 is provided for controlling automatically the energization and deenergization of the acknowledging cut-off magnet valve device 45 and the magnet valve device 255 of the timing valve mechanism 34 and includes manually operable switch mechanism (not shown) for controlling the changeover magnet valve device 52, electromagnet 284 of the magnet valve device 255 and electromagnet 434 of changeover magnet valve device 52 being connected to the track signal apparatus 35 by suitable pairs of wires as shown. As previously indicated, the track signal apparatus 35 includes two types of equipment which is responsive to the track block conditions. In the one type of track signal equipment known as the continuous type the acknowledging cut-off magnet valve device 45 is normally deenergized, the electromagnet 392 of the magnet valve device 45 being energized under the control of the track signal equipment only when a warning or stop signal is received by the track signal equipment. In the other type of track signal equipment known as the intermittent type, this feature of preventing premature effective operation of the acknowledging valve device 41 is eliminated, and the electromagnet 392 of the magnet valve device 45 is accordingly required to be normally energized.

In order, therefore, to establish suitable connections for energizing or deenergizing the acknowledging cut-off magnet valve device 45 dependent upon which type of track signal equipment is employed, I provide a pneumatic type of changeover switch 53. The changeover switch 53 may be of any suitable construction and is illustrated as comprising a casing 441 containing a piston 442 for actuating a pair of insulated contact members 443 and 444 into engagement with a pair of stationary contact members 445 and 446, respectively, through the medium of an operating stem 447. The piston 442 has a chamber 448 at one side thereof which is constantly connected to the pipe 416 leading to the piston chamber 412 of the system changeover valve device 51 by a branch pipe 449. When fluid under pressure is supplied to the piston chamber 412 of the changeover valve device 51 under the control of the changeover magnet valve device 52, fluid under pressure is thus also supplied to the chamber 448 of the changeover switch 53 and the contact members 443 and 444 are actuated into contact with the contact members 445 and 446 respectively. Contained in a chamber 451 at the opposite side of the piston 442 is a return spring 452 which is effective to shift the piston downwardly, whenever fluid under pressure is vented from the chamber 448, to separate the contact members 443 and 444 from the contact members 445 and 446 respectively, and to shift them into engagement with a pair of stationary contact members 453 and 454, respectively.

The movable contact members 443 and 444 are connected by wires 456 and 457 to opposite terminals of the electromagnet 392 of the magnet valve device 45. The stationary contact members 445 and 446 are connected by wires 458 and 459 respectively to the track signal apparatus 35. Stationary contact members 453 and 454 are connected by wires 461 and 462 respectively to opposite terminals of a suitable source of current such as the battery 463, the opposite terminals of the battery 463 also being connected to the track signal apparatus 35 by the wires 461 and 462.

It will thus be seen that when the changeover switch 53 is actuated so that the contact members 443 and 444 engage the contact members 445 and 446 respectively, the electromagnet 392 of the magnet valve device 45 is connected to the track signal apparatus 35 which is effective to cause energization of the electromagnet 392 only upon the reception of a warning or stop signal by the track signal apparatus. If the fluid under pressure is vented from the chamber 448 of the changeover switch 53 and the contact members 443 and 444 accordingly actuated into engagement with contact members 453 and 454, it will be seen that the electromagnet 392 of the magnet valve device 45 is connected directly across the terminals of the battery 463 and that it is accordingly maintained constantly energized.

The interlock switch 40 is similar in construction to the acknowledging switch 44 and comprises a casing 464 containing a piston 465 for actuating a movable contact member 466 through the medium of a stem 467 into engagement with a stationary contact member 468. At one side of the piston 464 is a chamber 469 which is constantly connected by a branch pipe 471 to the pipe 238 leading from the application valve device 16 to the double check valve device 30 and fluid under pressure supplied to the chamber 469 from the pipe 238 moves the piston against the force of a spring 472 interposed in a chamber 473 at the opposite side of the piston and between the casing and the piston, so as to cause the movable contact member 466 to engage the contact member 468. When fluid under pressure is released from the chamber 469, in the manner hereinafter described, the spring 472 shifts piston 465 downwardly to effect separation of the contact member 466 from the contact member 468. The interlock switch 40 is connected in series relation with the acknowledging switch 44 to the track signal apparatus 35 through suitable wires as shown and thus when the interlock switch 40 is in circuit-opening position the operation of the acknowledging switch to circuit-closing position is ineffective.

The suppression switch 46 is similar in construction to the acknowledging switch 44 and comprises a casing 551 containing a piston 552 which is controlled according to the unbalance between the pressure of fluid in a chamber 553 at one side thereof which is connected to the suppression pipe 196, and the tension of a biasing spring 554 contained in a chamber 555 at the opposite side thereof to actuate a movable contact member 556 into and out of engagement with a pair of stationary contact members 557. One of the contact members 557 is connected by a wire 558 to the wire 458 leading to the track signal apparatus 35, as by connection to the contact member 445 of the changeover switch 53. The other contact member 557 is connected by a wire 559 to the track signal apparatus 35.

The circuit connections (not shown) of the suppression switch 46 through track signal apparatus 35 with the acknowledging switch 44 and interlock switch 40 are such that if, when a warning or stop signal is received by the track signal apparatus 35, the acknowledging switch 44 is immediately closed, the operation of the suppression switch 46 to circuit-closing position is effective to maintain the magnet valve device 255 of timing valve mechanism 34 energized and thus suppress a train control application of the brakes in the manner to be hereinafter more fully described.

Referring to Fig. 3, the brake controlling valve device 21 is shown in the form of a triple valve of well known construction and details of construction therefore are not shown. Briefly, however, the piston chamber of the brake control valve device 21 is connected to the brake pipe 17 through a branch pipe 475, the auxiliary reservoir 22 is connected to the slide valve chamber of the brake control valve device 21 by a branch pipe 476, and the brake cylinder port of the brake control valve device 21 is connected by a pipe 477 to one end of the double check valve 478, the opposite end of which is connected to the straight air pipe 32.

The double check valve 478 is of well known construction and comprises a valve piston 479 shiftable into two opposite positions in engagement with the gasket seats 481 and 482 respectively, to establish communication from the brake control valve 21 through the pipe 477 to the brake cylinder 19 when seated on the gasket 482 and to establish communication from the straight air pipe 32 to the brake cylinder 19 when seated on the opposite gasket seat 481 as shown in Fig. 3.

The pressure in the straight-air pipe 32 is controlled by the magnet valve mechanism 29 which is of well known construction and which comprises an application magnet valve device 483 and a release magnet valve device 484. The application magnet valve device 483 comprises an application valve 485 which is contained in a chamber 486 constantly connected to the supply reservoir 31 through a pipe 487 and branch pipe 488, the valve 485 being yieldingly urged into seated relation on its associated valve seat by a biasing spring 489 contained in the chamber 486 and acting on the valve 485. An electromagnet 491 is effective when energized to actuate a plunger or stem 492 to unseat the valve 485 to establish communication from the chamber 486 to a chamber 493 which is connected to the straight-air pipe 32 through a passage 494. The supply reservoir 31 is constantly connected to the brake pipe 17 and charged with fluid under pressure therefrom through a portion of the pipe 487 containing a non-return or check valve 495 to prevent back flow of fluid under pressure from the supply reservoir to the brake pipe.

The release magnet valve device 485 comprises a release valve 496 contained in a chamber 497 which is constantly connected to the straight-air pipe 32 through the passage 494, the valve 496 having a biasing spring 498 acting thereon in the chamber 497 to yieldingly urge the valve toward an associated valve seat. An electromagnet 499 is effective, when energized, to actuate a plunger or stem 501 into engagement with the valve 496 to unseat it against the force of the spring 498 to establish communication from the chamber 497 to a chamber 502 which is constantly connected to the atmosphere through a port 503. When the electromagnet 499 is deenergized, the spring 498 is effective to seat the valve 496 and thus cut off communication from the chamber 497 and the connected straight-air pipe 32 to the atmospheric chamber 502.

Energization and deenergization of the magnet valve devices 483 and 484 is effected under the control of the pneumatic switch device 28.

The pneumatic switch device 28 comprises a casing 505 containing a movable abutment such as the diaphragm 506, the diaphragm 506 having a chamber 507 at one side thereof to which the control pipe 244 leading from the double check valve 30 is connected, and at the opposite side thereof a chamber 508 which is connected to the straight-air pipe 32 by a branch pipe 509. The diaphragm 506 is adapted to actuate a pair of movable contact members 511 and 512 into and out of contact with stationary contact members 511a and 512a, respectively, according to the relation of fluid pressure in the chambers 507 and 508.

Stationary contact member 511a is connected to a train wire 513 to which one terminal of the electromagnet 491 of the application magnet valve device 483 shown in Fig. 3 and corresponding electromagnets (not shown) on other cars are connected by a branch wire 514. The stationary contact member 512a is connected to a train wire 515 to which is connected one terminal of the electromagnet 499 of the release magnet valve device 484 by a branch wire 516, corresponding terminals of the electromagnets of release magnet valve devices 484 on other cars being similarly connected. The remaining terminals of the electromagnets 491 and 499 are connected to one terminal of a source of current such as the battery 517 in any suitable manner, as through a ground connection 518. The terminal of the battery 517 opposite to the grounded terminal is connected by a wire 519 to both of the movable contacts 511 and 512.

When fluid under pressure is supplied through the control pipe 244 to the chamber 507 in a manner to be described hereinafter, the diaphragm 506 is urged downwardly to separate the contact member 512 from the contact member 512a, and thus interrupt the circuit normally completed therethrough for energizing the release electromagnet 499. Release magnet 499 is thus deenergized. Upon a sufficient increase in the pressure of the chamber 507, the diaphragm 506 causes the contact member 511 to engage the contact member 511a and thus complete the circuit for energizing the application electromagnet 491. As the pressure of the fluid, supplied from the supply reservoir 31 past the application valve 485 to the straight-air pipe 32, builds up through pipe 509 in the chamber 508, the diaphragm 506 is returned upwardly to effect separation of the contact member 511 from the contact member 511a. This interrupts the circuit of the application electromagnet 491 and the further supply of fluid under pressure to the straight-air pipe 32 is cut off. Pressure in the chamber 507 and the chamber 508 are thus so balanced as to position the diaphragm 506 in a position to separate the contact members 511 and 512 from their associated contact members 511a and 512a, accordingly interrupting the circuit for both the application electromagnet 491 and the release electromagnet 499. Consequently, the magnet valve mechanism 29 is conditioned to prevent both the supply of fluid under pressure to the straight-air pipe and its release therefrom, so that the brakes are maintained applied according to the pressure supplied to the brake cylinder 19 from the straight-air pipe 32.

The sander valve device 54, one of which may be provided on each car, comprises a casing 521 containing a piston 522 having a piston chamber 523 at one side thereof to which is constantly connected the pipe and passage 326 leading from the application valve device 16. The sander valve device 54 further comprises a pair of oppositely seating valves 525 and 526 which are contained in a chamber 527 constantly connected through a pipe and passage 528 to the sanding reservoir 55. The valve 526 has a fluted stem 529 extending into a chamber 531 which is constantly connected through a branch pipe and passage 532 to the feed valve pipe 15, a biasing spring 533 contained in the chamber 531 acting on the end of the fluted stem 529 to yieldingly urge valves 525 and 526 into seated and unseated positions respectively. Communication is thus established from the feed valve pipe 15 through the pipe 532, chamber 531, past the unseated valve 526, through chamber 527 and pipe and passage 528 to charge the sanding reservoir 55. Whenever fluid under pressure is supplied to the chamber 523 from the pipe 326, the piston 522 is actuated downwardly to shift the valves 525 and 526 to unseated and seated positions respectively. The valve 526, when seated, cuts off the charging communication for the sanding reservoir 55, and the valve 525 when unseated establishes communication from the chamber 527 to a chamber 535 which is constantly connected through a pipe and passage 536 to the sander device 56 so that the fluid under pressure from the sanding reservoir 55 may be discharged through the sander device 56 to atmosphere to cause sanding of the rails. A one-way or non-return valve 537 prevents back flow of fluid under pressure from the sander device 56 to the sander valve device 74 through the pipe 536.

Operation

(a) Charging of the equipment

With the operating handle 154 of the brake valve device 25 in release position, with the brake valve changeover valve device 26 in the straight-air position, and with the equipment otherwise conditioned as shown in Figs. 1, 2 and 3, the equipment is charged with fluid under pressure from the main reservoir 11.

The feed valve pipe 15 is charged with fluid under pressure from the feed valve reservoir 12 which is in turn charged with fluid under pressure from the main reservoir 11 through feed valve No. 1, the pressure of the fluid as regulated by feed valve No. 1 being less than the pressure maintained in the main reservoir 11, which may be of the order of one hundred and twenty to one hundred and thirty pounds per square inch. Fluid under pressure is supplied from the feed valve pipe 15 to the rotary valve chambers 143 and 144 of the brake valve device 25 through the pipe and passage 145 and, in the case of the chamber 143, also through the branch passage 146.

With the acknowledging valve device 41 in its normal position shown in Fig. 1, fluid under pressure is also supplied from the feed valve pipe 15 through the pipe and passage 205, acknowledging valve 41, pipe 379 to acknowledging reservoir No. 1 and thence by way of pipe and passage 422, cavity 421 in slide valve 414 of the system changeover valve device 51 and pipe and passage 423 to the acknowledging reservoir No. 2.

Fluid under pressure is also supplied from the feed valve pipe 15 to charge the brake pipe 17, fluid flowing through the branch pipe 205, branch pipe and passage 201, cavity 204 in the rotary valve 168 of the changeover valve device 26, passage and pipe 106, chamber 103 of the cut-off valve device 64 of the application valve device 16, through the passage 104, chamber 102 and passage and pipe 92 to the brake pipe 17. The brake pipe chamber 89 beneath equalizing discharge piston 84 of the equalizing discharge valve device 63, being connected to the pipe and passage 92 through the passage 91, is likewise charged to the same pressure as the brake pipe 17.

The cavity 204 in the rotary valve 168 of the changeover valve device 26 also connects the passage and pipe 201 to the passage and pipe 203 and communication is thus established for the charging of the equalizing reservoir 86 and equalizing chamber 85 of the equalizing discharge valve device 63 by way of pipe and passage 203, cavity 207 in the slide valve 71 of the application valve device 16, passage and pipe 87 to the equalizing reservoir 86, and branch passage 88 to the equalizing chamber 85.

Feed valve pressure supplied to the chamber 103 of the cut-off valve device 64 leaks past the loose fitting piston 98 into the chamber 107 and thence to the chamber 108 at the outer face of the piston 99 through the passage 109, cavity 111 in the slide valve 71 of the application valve device 16, and passage 112.

Chamber 353 of the reduction insuring valve device 39 is charged with fluid under pressure from the feed valve pipe 15 through the branch pipes 205 and 354 while the chamber 349 of the reduction insuring valve device 39 is charged with fluid under pressure from the brake pipe 17 through the branch pipe and passage 351, the pressures on opposite sides of the diaphragm 352 thus being substantially balanced and the insuring valve being conditioned to connect the pipe 213 to atmosphere through the atmospheric port 344.

Fluid under pressure is also supplied from the feed valve pipe 15 through the branch pipes 72 and 73 to the slide valve chamber 68 of the application valve device 16 and through the choke port 74 in the piston 66 to the piston chamber 67 and thence through pipe and passage 78 to the chamber 264 of the timing valve mechanism 34 and through the branch pipe 79, by-pass communication 82, and restricted passage 83 to the volume reservoir 77. When the pressure in the piston chamber 67 and slide valve chamber 68 on opposite sides of the piston 66 are substantially equalized, the biasing spring 77 is effective to shift the piston 66 to the position shown wherein the port 239 in the slide valve 71 registers with the pipe and passage 238 and thus establishes communication for the supply of fluid under pressure from the slide valve chamber 68 through the port 239 and passage and pipe 238 to the interlock switch 40 and chamber 237 of the double check valve device 30. The interlock switch 40 is accordingly actuated to circuit-closing position and the valve pistons 232 and 233 of the double check valve 30 shifted downwardly to the position shown.

With the changeover magnet valve device 52 energized, fluid under pressure is supplied to the piston chamber 412 of the system changeover valve device 51 from the branch pipe 72 of feed valve pipe 15, chamber 432 of the changeover magnet valve device 52, past the valve 429, through chamber 437 and passage and pipe 416. At the same time, fluid under pressure is supplied from the pipe 416 to the chamber 448 of the changeover switch 53 to shift the contact members 443 and 444 into contact with the stationary contact members 445 and 446 as shown. The slide valve chamber 415 of the piston changeover valve device 51 is constantly charged with fluid under pressure from the feed valve pipe 15 by way of the branch pipes 72 and 417. With the fluid pressures in chambers 412 and 413 on opposite sides of the piston 411 thus substantially equalized, the biasing spring 418 is effective to shift the piston 411, and the slide valve 414 to the position shown.

The sanding reservoir 55 is charged with fluid under pressure from the feed valve pipe 15 under the control of the sander valve device 54 in the manner previously described. The supply reservoir 31 is charged with fluid under pressure from the brake pipe 17 through the pipe 487 containing the check valve 405, and the auxiliary reservoir 22 is charged with fluid under pressure from the brake pipe by way of the branch pipe 475 under the control of the brake control valve device 21.

Fluid under pressure is also supplied from the main reservoir pipe 14 to the piston chamber 261 of the pneumatic valve device 254 of the timing valve mechanism 34 through branch pipes 291 and 292, feed valve No. 3, pipe 294, chamber 283 of the magnet valve device 255 past the unseated valve 278, chamber 281, passage 297, past the check valve 299, and through passage 301. The piston 259 of the pneumatic valve device 254 is accordingly shifted upwardly to seat the double beat valve 256 on its upper seat 267 as shown, and the timing reservoir No. 2 which is connected to the piston chamber 261 through the pipe and passage 301, cavity 424 in the slide valve 414 of the system changeover valve device 51, and pipe and passage 425, is simultaneously charged.

Fluid under pressure is also supplied from the main reservoir pipe 14 through the branch pipes 291 and 292, feed valve No. 2 to the pipe and passage 296 opening at the seat of the slide valve 71 of the application valve device 16. However, passage 296 is lapped by the slide valve 71 in the normal position of the slide valve.

The brake cylinder 19 is connected to atmosphere as shown through the double check valve 478, straight-air pipe 32, passage 494 of the magnet valve mechanism 29, chamber 497 past the unseated release valve 496, chamber 502 and exhaust port 503.

(b) *Manual straight-air operation of the brakes*

With the equipment conditioned as shown in Figs. 1, 2 and 3 and charged with fluid under pressure in the manner just described, a straight-air application of the brakes may be effected by turning the operating handle 154 of the brake valve device 25 from the release position to the service position.

As will be seen in Fig. 5, with the operating handle 154 of the brake valve device 25 in service position, the upper rotary valve 147 is effective to connect the passages 174, 175 and 176 through a cavity 581 therein and also connects the rotary valve chamber 143 to the passage 173 through a port 582. At the same time, the lower rotary valve 148, in the service position of the operating handle 154, is positioned to connect pipe and passage 179, leading from the reduction limiting reservoir No. 1 to the atmospheric exhaust port 184 through a cavity 583 therein and to connect the rotary valve chamber 143 to the port and passage 183 through a port 584 to supply fluid under pressure to chamber 317 of the suppression valve device 37 and to chamber 553 of the suppression switch 46.

Fluid under pressure is accordingly supplied from the rotary valve chamber 143 through the port 582 in the upper rotary valve 147, passage 173, cavity 218 in the rotary valve 168 of the changeover valve device 26, passage and pipe 208, passage or chamber 236 in the double check valve device 30, annular chamber 242 and control pipe 244 to the chamber 507 of the pneumatic switch device 28. Fluid under pressure also flows from the passage 236 of the double check valve device 30 through the pipe and passage 123 to the inner seated area of the piston valve 118 of the insuring valve device 65 in the application valve device 16.

The pneumatic switch device 28 accordingly operates to control the energization and deenergization of the application and release magnet valve devices 483 and 484, in the manner previously described, to cause fluid under pressure to be supplied from the supply reservoir 31 to the brake cylinder 19 to effect application of the brakes, the degree of brake cylinder pressure attained corresponding to that attained in the straight-air pipe 32 which is in turn determined according to the pressure in the control pipe 244 and chamber 507 of the pneumatic switch device 28.

Fluid under pressure supplied to the suppression valve device 37 and to suppression switch 46 merely causes ineffective operation thereof at this time, the function and purpose of the suppression valve device and switch being made clear hereinafter in connection with a train control application of the brakes to be hereinafter described.

When the desired degree of application of the brakes is attained, the operator returns the operating handle 154 of the brake valve device 25 to lap position wherein the supply of fluid under pressure from rotary valve chamber 143 to passage 173 through port 582 is cut off at the seat of the upper rotary valve 147 and wherein a cavity 585 in the upper rotary valve 147 connects the passage 174, which is lapped at the seat of the rotary valve 168 of the changeover valve device 26, to the passage 175 which is connected through the cavity 223 in the rotary valve 168 to the exhaust port 212.

At the same time, with the operating handle 154 of the brake valve device 25 in lap position, the lower rotary valve 148 connects the passage 182 to the passage 183 through a cavity 586 therein. The purpose of this connection will be made clear in connection with a train control application of the brakes to be described later.

For present purposes, the effect of returning the operating handle 154 of the brake valve device 25 to lap position is to cut off the supply of fluid under pressure from the rotary valve chamber 143 to the passage 173 leading to the double check valve 30 and the control pipe 244.

The pressure in the control pipe 244 and chamber 507 of the pneumatic switch device 28 may be increased in steps to graduate the application of the brakes, or the pressure in the control pipe and the chamber 507 may be increased as desired for increasing the degree of application of the brakes, by returning the operating handle 154 from lap position to service position and upon the attainment of the desired degree of application of the brakes returning the handle again to lap position. With each increase in the pressure of the fluid in chamber 507, the pneumatic switch device 28 functions to supply fluid under pressure from the supply reservoir 31 to the straight-air pipe 32 and accordingly to the brake cylinder 19 to a degree corresponding to the increase in the pressure in the chamber 507.

The maximum degree of application of the brakes for straight-air operation is attained when the pressure in the control pipe 244 and chamber 507 of the pneumatic switch device 28 is built up to full feed valve pipe pressure, it being impossible to further increase the pressure in the control pipe 244.

Release of the brakes following a straight-air application thereof, effected in the manner just described, is effected by returning the operating handle 154 to release position. The upper rotary valve 147 and the lower rotary valve 148 are thus positioned as shown in Fig. 1 wherein the cavity 215 connects passage 173 to the passage 172 which is connected to the exhaust passage 212 through cavity 223 in the rotary valve 168 of the changeover valve device 26.

Fluid under pressure is accordingly vented from the chamber 507 of the pneumatic switch device 28 by way of the control pipe 244, double check valve device 30, pipe and passage 208, cavity 218 in the rotary valve 168 of the changeover valve device 26, passage 173, cavity 215 in the upper rotary valve 147, passage 172, cavity 223 in the rotary valve 168 and exhaust port 212.

The pneumatic switch device 28 is accordingly actuated by the higher pressure in the chamber 508 to effect reengagement of the contact members 512 and 512a and the separation of the contact members 511 and 511a to respectively effect energization of the release magnet valve device 484 and deenergization of the application magnet valve device 483. Fluid under pressure is accordingly vented from the brake cylinder 19 by way of the double check valve 478, straight-air pipe 32, release valve 496, and exhaust port 503, the pressure in the chamber 508 of the pneumatic switch device 28 correspondingly reducing. When the pressure in the chamber 508 of the pneumatic switch device 28 decreases slightly below the pressure in the chamber 507, the diaphragm 506 is actuated downwardly to effect interruption of the circuit of both the application and release magnet valve devices 483 and 484 and the consequent lapping of the brakes.

When the desired degree of reduction in the brake application has been made the handle 154 of the brake valve device 25 is returned to lap position wherein the passage 173 is lapped at the seat 149 of the upper rotary valve 147 and further reduction in the pressure in the control pipe 244 and chamber 507 of the pneumatic switch 28 is stopped. Accordingly the brakes remain applied according to the degree of pressure maintained in the control pipe 244.

The degree of application of the brakes may be reduced in steps by successively moving the operating handle 154 of the brake valve device 25 to release position and, after the desired degree in reduction of the application is attained, returning the operating handle to lap position.

Complete release of the brakes is effected by returning the operating handle 154 to release position and allowing it to remain there, fluid under pressure being accordingly completely vented from the control pipe 244 whereby the pneumatic switch device 28 is operated to cause complete venting of fluid under pressure from the brake cylinder 19.

(c) *Manual automatic service operation of the brakes*

If the engineman desires to effect application of the brakes manually by automatic operation, that is, by varying the pressure in the brake pipe 17, he shifts the handle 154 of the brake valve device 25 to the exterior end of the operating stem of the changeover valve device 26 and rotates the rotary valve 168 into the automatic position thereof, after which he returns the operating handle 154 to the exterior end portion 153 of the operating stem 152. As will be seen in Fig. 6, in the automatic position of the brake valve changeover valve device 26, the rotary valve 168 is positioned so that a cavity 588 therein connects the passage 174 to the passage 203, a passage 589 therein connects the passage 173 to the passage 201, and a cavity 591 connects the passage 106 to the passage 172. The rotary valve 168 is also provided with a cavity or passage 592 which is effective in the automatic position of the rotary valve 168 to connect the passages 129, 176 and 208 to the exhaust port and passage 212, the rotary valve 168 being further provided with a cavity 593 which, in the automatic position of the rotary valve 168, connects passage 196 to the passage 213. In the automatic position of the rotary valve 168, the passages 175, 182, 209 and 211 are lapped at the seat of the rotary valve.

In the automatic position of the rotary valve 168, different communications are established through which the brake pipe 17, the equalizing chamber 85, and equalizing reservoir 86 are charged with fluid under pressure from the feed valve pipe 15, compared to the charging communications, previously described, for the rotary valve 168 in straight-air position. With the rotary valve 168 in automatic position, the equalizing chamber 85 of the equalizing discharge valve device 63 and the equalizing reservoir 86 are charged with fluid under pressure from the feed valve pipe 15 through branch pipe 205, pipe and passage 201, passage 589 in the rotary valve 168, passage 173, cavity 215 in the upper rotary valve 147 of the brake valve device 25, passage 174, cavity 588 in the rotary valve 168, and thence through the passage and pipe 203, cavity 207 in the slide valve 71 of the application valve device 16 and passages 87 and 88. The charging communication for the brake pipe 17 is established from the feed valve pipe 15 to the cavity 215 in the upper rotary valve 147 of the brake valve device 25 in the manner just described, and thence through passage 172, cavity 591 in the rotary valve 168, the passage and pipe 106 leading to chamber 103 of the cut-off valve device 64 of the application valve device 16, and thence to the brake pipe 17 in the manner described previously.

With the rotary valve 168 of the changeover valve device 26 in automatic position and the equipment charged with fluid under pressure as just described, an automatic service application of the brakes is effected manually by operation of the operating handle 154 of the brake valve device 25 to service position wherein the upper rotary valve 147 and the lower rotary valve 148 establish the same connections at the seats thereof as previously described for operation of the operating handle to service position in a straight-air application of the brakes.

The port 582 in the upper rotary valve 147 is positioned to connect the passage 173, which is supplied with fluid under pressure from the feed valve pipe 15 as previously described, to the rotary valve chamber 143 to assist in maintaining the pressure therein, while the passage 174 is connected by the passage 581 in the upper rotary valve 147 with the passages 175 and 176 leading to the seat 169 of the rotary valve 168. The passage 175 is lapped at the seat 169 of the rotary valve 168 and consequently the connection from the passage 174 to the passage 175 is without effect. However, the connection from the passage 174 to the passage 176 establishes a communication through which fluid under pressure from the equalizing reservoir 86 and from the equalizing chamber 85 of the equalizing discharge valve device 63 is vented to atmosphere, fluid flowing from the equalizing reservoir and equalizing chamber through the passage 87, cavity 207 in the slide valve 71 of the application valve device 16, passage and pipe 203, cavity 588 in the rotary valve 168 of the changeover valve device 26, passage 174, passage 581 in the upper rotary valve 147, passage 176, including the choke 177 therein, and passage 592 in the rotary valve 168 to the atmospheric exhaust port and passage 212. The passage 172 is lapped at the seat of the upper rotary valve 147 and consequently the supply of fluid under pressure from the feed valve pipe therethrough to the brake pipe is cut off.

The choke 177 in the passage 176 is so designed as to restrict the rate of reduction of the pressure in equalizing reservoir 85 to the usual service rate of reduction. Upon the reduction of pressure in equalizing chamber 85 above the equalizing piston 84, the higher brake pipe pressure in the chamber 89 beneath the piston 84 shifts the piston upwardly into sealing contact with a gasket 80 and thus unseats the discharge valve 93 to open communication from the chamber 89 to the chamber 95, from which fluid under pressure is discharged to atmosphere at a restricted rate through the choke 97 and pipe 96, which may lead to a point near the operator so that the discharge of air therefrom may serve as an indication to the operator of the proper functioning of the equalizing discharge valve device 63.

Due to the choked passage 97 restricting the rate of flow of fluid from the chamber 95 to atmosphere, the pressure in the brake pipe chamber 89 and the brake pipe 17 causes a build-up of pressure in the passage and pipe 213, part of the fluid under pressure discharged past the discharge valve 93 thus being supplied through the pipe 213 past the check valve 361 and to atmosphere by way of the branch pipe 338 leading to the reduction insuring valve device 39, choked passage 339, chamber 336, past the open valve seat 350, through the bore 342, chamber 343 and out through the exhaust port 344. Due to the restriction of the choke passage 339, pressure is built up in timing reservoir No. 1 connected through branch pipe 364 to the pipe 213 just beyond the branch pipe 338, the choke passage 365 in the pipe 213 just beyond the branch pipe 364 further assisting in the build-up of pressure in the timing reservoir No. 1.

Fluid under pressure is also supplied into the pipe 213 from rotary valve chamber 143 through port 584 in lower rotary valve 148 of brake valve device 25, passages 183 and 196, and cavity 593 in rotary valve 168, to assist in building up pressure in timing reservoir No. 1, the choked passage 365 being effective to cause substantially immediate build-up of fluid under pressure in the suppression pipe and passage 196 leading to the suppression valve device 37 and the suppression switch 46.

The purpose and the effect of the supply of fluid under pressure to timing reservoir No. 1 and to the suppression valve device 37 and suppression switch 46 in the manner just described will be made apparent hereinafter in connection with a train control application of the brakes, there being no effective results produced thereby for the operation now being described, except that the discharge of fluid under pressure through the pipe 213 assists in the discharge of fluid under pressure from the brake pipe 17.

The equalizing discharge valve device 63 functions to reduce the pressure in the brake pipe in the manner similar to that of the equalizing discharge valve of the well known type of automatic brake valve, that is, the rate of reduction in brake pipe pressure 17 corresponds to the rate of reduction in equalizing reservoir and equalizing chamber pressure. Since the choke 177 restricts the rate of reduction in the equalizing reservoir and equalizing chamber pressure to a service rate, it follows that the brake pipe pressure is reduced at a service rate when the operating handle 154 of the brake valve device 25 is in service position. Upon the reduction in the pressure in the brake pipe 17 at a service rate, the brake control valve device 21 functions in the usual well known manner to supply fluid under pressure from the auxiliary reservoir 22 through the pipe 477 to the double check valve 478, where it acts to shift the valve piston 479 to the seat 482, if not already in such position, and establish communication through the double check valve 478 to the brake cylinder 19.

When the desired degree of service application of the brakes has been effected, the operator returns the operating handle 154 of the brake valve device 25 to lap position wherein the connection between the passages 174 and 176 is cut off at the seat of the upper rotary valve 147. Further reduction in equalizing reservoir and equalizing chamber pressure is thus stopped and the equalizing discharge valve device 63 accordingly operates to seat the discharge valve 93 and cut off further reduction in the brake pipe pressure. The brake control valve device 21 accordingly operates in the well known manner to lap position to maintain the pressure in the brake cylinder 19 at the degree determined by the degree of reduction in the brake pipe pressure.

An increased degree of service application of the brakes may be effected by again turning the operating handle 154 of the brake valve device 25 to service position to effect a further reduction in brake pipe pressure and, when the desired increase in the degree of application of the brakes is attained, returning the operating handle to lap position. The maximum or full service application of the brakes is attained when the brake pipe pressure is sufficiently reduced that the pressure in the auxiliary reservoir 22 equalizes with the pressure in the brake cylinder 19.

Following a service application of the brakes effected in the manner just described, a partial release of the brakes may be effected by turning the operating handle 154 from lap position to release position to establish the communications, previously described, for building up the pressure in the brake pipe 17, the equalizing reservoir 86, and equalizing chamber 85. The brake control valve device 21 accordingly functions in the usual manner to charge the auxiliary reservoir 22 accordingly and release fluid under pressure from the brake cylinder 19.

When the desired degree of reduction in the degree of application of the brakes has been effected, the operator returns the operating handle 154 of the brake valve device 25 to lap position to cut off the further increase in pressure in the brake pipe, equalizing reservoir and equalizing chamber.

A graduated release may be effected by turning the operating handle 154 of the brake valve device 25 repeatedly, in succession, from the lap position to the release position and back to lap position again.

Complete release of the brakes is effected by returning the operating handle 154 to release position and allowing it to remain there, the brake pipe 17, equalizing reservoir and equalizing chamber being accordingly fully charged again in the manner previously described. The brake control valve device 21 is accordingly operated upon the restoration of the brake pipe pressure to its normal pressure to fully charge the auxiliary reservoir 22 and completely release fluid under pressure from the brake cylinder 19 to effect complete release of the brakes.

*(d) Manual automatic emergency operation of the brakes*

Let it be assumed that the train is traveling along the tracks with the brakes released, the brake control equipment being conditioned as shown in Figs. 1, 2 and 3 except that the rotary valve 168 of the brake valve changeover valve device 26 is in automatic position and that the operator desires to effect manually an automatic emergency application of the brakes. To do so, the operator turns the operating handle 154 of the brake valve device 25 to emergency position in which the cam 155 on the operating stem 152 is effective to unseat the piston valve 157 to vent the passage 172 to atmosphere through the exhaust passage 166 at the brake valve. As will be seen in Fig. 5, with the brake valve handle 154 in emergency position, the upper rotary valve 147 of the brake valve device 25 is positioned to connect the passage 172 to the passage 174 through a cavity 625 in the rotary valve, and to connect the rotary valve chamber 143 to the passage 173 through a port 626 in the rotary valve. With the brake valve handle 154 in emergency position, the lower rotary valve 148 is positioned to connect the rotary valve chamber 143 to the passage 183 through a port 627, and the other passages opening at the seat of rotary valve 148 are lapped (Fig. 5).

Since the passage 172 is connected through cavity 591 in the rotary valve 168 to the passage and pipe 106 through which the brake pipe is charged, and since the passage 174 is connected through the cavity 588 of the rotary valve 168 to the passage and pipe 203 through which the equalizing reservoir 86 and equalizing chamber 85 of the equalizing discharge valve device 63 are charged, it will be apparent that the unseating of the piston valve 157 of the brake valve device 25 will cause fluid under pressure to be simultaneously vented through exhaust port 166 from the equalizing reservoir, the equalizing chamber and the brake pipe.

The equalizing discharge valve device 63 of the application valve device 16 accordingly operates in the manner previously described for an automatic service application of the brakes, to vent fluid under pressure from the brake pipe 17 to the discharge chamber 95 and thence to atmosphere partly through choke 97 and pipe 96 and partly through the passage and pipe 213, the total rate of reduction in brake pipe pressure being at an emergency rate.

With the brake valve handle 154 in emergency position the lower rotary valve 148 is positioned to connect the rotary valve chamber 143 to the passage 183 to supply fluid under pressure to the suppression valve device 37 and suppression switch 46, and also to the pipe 213 to assist in charging the timing reservoir No. 1, in the same manner as previously described for a service application of the brakes. As in the case of the service application of the brakes, the supply of fluid under pressure to the suppression valve device 37 and suppression switch 46, as well as the charging of the timing reservoir No. 1, is without productive effect in the present instance.

Upon a reduction in brake pipe pressure at an emergency rate, the brake control valve device 21 functions in the usual manner for an emergency application of the brakes to supply fluid under pressure from the auxiliary reservoir 22 to the brake cylinder 19.

Release of the brakes following an automatic emergency application of the brakes manually effected as just described, is effected by returning the operating handle 154 of the brake valve device 25 to release position wherein the piston valve 157 is reseated and the communications, previously described, are established to cause charging of the brake pipe, equalizing chamber and equalizing reservoir. Restoration of brake pipe pressure to the normal pressure causes operation of the brake control valve device 21 in the usual manner to effect recharging of the auxiliary reservoir 22 and complete venting of fluid under pressure from the brake cylinder.

(e) *Adequate manual application of the brakes by straight-air causing suppression of train control application*

Let it be assumed that the train is travelling along the track with the equipment conditioned as shown in Figs. 1, 2 and 3, the rotary valve 168 of the changeover valve device 26 being in straight-air position and the operating handle 154 of the brake valve device 25 being in release position with the brakes completely released, a warning or stop signal is received by the track signal apparatus 35. The operator is immediately informed of the reception of the signal by audible and visible indicating means (not shown) included in the track signal apparatus 35 and, under the control of the track signal apparatus 35, the electromagnet 284 of the magnet valve device 255 of the timing valve mechanism 34 and the electromagnet 392 of the acknowledging cut-off magnet valve device 45 are automatically deenergized and energized respectively.

Upon the deenergization of the magnet valve device 255 of the timing valve mechanism 34, the communication is established through which fluid under pressure is vented from the piston chamber 261 of the pneumatic valve device 254 of the timing valve mechanism 34 and the timing reservoir No. 2 connected to the chamber 261, fluid flowing from the timing reservoir No. 2 and chamber 261 through the passages 301 and 297, choke passage 298, passage 297, chamber 281 of the magnet valve device 255, past the unseated valve 277, chamber 282, passage 288 and choke port 289. However, due to the size of the choked passage 298, it requires a definite interval of time for the pressure in the chamber 261 to reduce sufficiently so that the spring 280 may become effective to shift the piston 259 downwardly into engagement with the gasket seat 235 and thus permit shifting of the double beat valve 256 into engagement with its lower seat 268.

This time interval may be of the order of six to ten seconds and the operator, if he is on the alert, has the option of manually operating the operating handle 154 of the brake valve device 25 to an application position or, as his judgment might dictate under the circumstances, of operating the operating handle 375 of the acknowledging valve device 41 to acknowledging position to suppress a train control application.

Let it be assumed that the operator chooses to effect a service application of the brakes within the time interval permitted by the timing valve mechanism 34, and that he accordingly operates the operating handle 154 of the brake valve device 25 to service position.

A straight-air application of the brakes is accordingly effected in the manner previously described to a degree depending upon the manner of operation of the brake valve handle 154.

Upon the supply of fluid under pressure from the rotary valve chamber 143 through the port 584 in the lower rotary valve 148 of the brake valve 25 to the passage 183 and suppression pipe 196 leading to the suppression valve device 37, the pressure established in the chamber 317 of the suppression valve device overcomes the tension of the spring 322 and the diaphragm 315 is accordingly shifted to the right-hand direction to shift the double beat valve 304 away from the valve seat 313 and cause it to seat on the valve seat 314. Thus, when the pressure in the chamber 261 and timing reservoir No. 2 is reduced sufficiently so that the piston 259 is shifted downwardly into engagement with the gasket seat 275 and the double beat valve 256 is shifted into engagement with the lower valve seat 268, the communication through which fluid under pressure would otherwise be vented from the piston chamber 67 of the application valve device 16 and the connected volume reservoir 77 to the stop reservoir 305 by way of the passage and pipe 258 and suppression valve device 37 is cut off at the seat 314 of the double beat valve 304. Consequently, the reduction in the pressure in the piston chamber 67 of the application valve device 16 is insufficient to cause shifting of the piston 66 and the slide valve 71 operated thereby out of the normal position shown in Fig. 2.

Depending upon the degree of the straight-air application of the brakes, the piston 66 and slide valve 71 of the application valve device 16 may or may not thereafter remain in the normal position shown. If the degree of brake cylinder pressure established by the straight-air application of the brakes is in excess of a certain uniform pressure such as forty pounds per square inch, the pressure of the fluid supplied from the double check valve device 30 through the pipe and passage 123 to the inner seated area of the piston valve 118 during the straight-air application of the brakes unseats the piston valve 118 from the annular rib seat or bushing 120 against the force or tension of the spring 121 of the insuring valve device 65 and shifts the piston valve in the right-hand direction into seated relation on the gasket seat 135. Accordingly, passage and pipe 129 is cut off from the atmospheric port and passage 132 at the insuring valve device 65 and fluid under pressure is supplied from the pipe and passage 123 through the chamber 125, choke passage 127, annular chamber 126, through the pipe and passage 129 which, in the straight-air position of the rotary valve 168 of the changeover valve device 26, is connected by cavity 219 in the rotary valve 168 to the passage 182 leading to the seat 151 of the lower rotary valve 148 of the brake valve device 25.

Since the operator returns the handle 154 of the brake valve device 25 to lap position after effecting the desired degree of straight-air application, the lower rotary valve 148 is positioned in lap position and consequently the passage 182 is connected through cavity 586 in the lower rotary valve 148 to the passage 183 and thus to the suppression pipe 196 leading to the chamber 317 of the suppression valve device 37.

The spring 322 of the suppression valve device 37 is so designed as to be ineffective to overcome fluid pressure greater than the certain uniform pressure of forty pounds per square inch and consequently the pressure in the chamber 317 is effective to maintain the double beat valve 304 seated on the valve seat 314 to maintain cut off the communication of the venting pipe 258, leading from the timing valve mechanism 34, to the stop reservoir 305. As a result, the piston 66 and slide valve 71 of the application valve device 16 remains in the normal position shown in the drawings.

It will thus be seen that if the operator causes a straight-air application of the brakes to be effected to a degree in excess of a certain pressure as determined by the strength of the spring 121 of the insuring valve device 65, a train control application of the brakes which would otherwise be effected in the manner to be hereinafter described, is suppressed.

(f) *Inadequate manual application of the brakes by straight-air resulting in a train control application of the brakes*

Let it now be assumed that the operator effected a straight-air application of the brakes, immediately following the reception of a warning signal by the track signal apparatus 35, to a degree less than the pressure sufficient to overcome the tension of the spring 121 of the insuring valve device 65. In such case, the initial supply of fluid under pressure from the rotary valve chamber 143 to the chamber 317 of the suppression valve device 37 through the port 584 in the lower rotary valve 148 of the brake valve device 25, passage 183 and suppression pipe 196 is effective, as previously described, to shift the double beat valve 104 into engagement with the valve seat 314 to temporarily cut off the connection between the venting pipe 258 leading from the timing valve mechanism 34 to the stop reservoir 305. Temporary suppression of the train control application of the brakes is thus effected as long as the operating handle 154 of the brake valve device 25 remains in the service position. However, upon the return of the operating handle 154 to lap position, and the connection of the passages 182 and 183 by the cavity 586 in the lower rotary valve 148 of the brake valve device 25, communication is established through which fluid under pressure is vented to atmosphere from the chamber 317 of the suppression valve device 37. Fluid under pressure is accordingly vented to atmosphere from the chamber 317 of the suppression valve device 37 through the branch pipe 318, suppression pipe 196, passage 183, cavity 586, passage 182, cavity 219 in the rotary valve 168 of the changeover valve device 26, passage and pipe 129, annular chamber 128 of the insuring valve device 65, port 134, chamber 131 at the right-hand face of the piston valve 118, and exhaust port and passage 132.

Upon a sufficient reduction in the pressure of the fluid in the chamber 317 of the suppression valve device 37 in the manner just described, spring 322 becomes effective to shift the diaphragm 316 in the left-hand direction and thus permits shifting of the double beat valve 304 in the left-hand direction to unseat the valve 304 from the valve seat 314 and into seated relation on the valve seat 313. Communication is thus established from the venting pipe 258 leading from the timing valve mechanism 34 through chamber 309 of the suppression valve device 37, bore 308, past the open valve seat 314, chamber 303, and pipe 306 to the stop reservoir 305. The pressure in the piston chamber 67 of the application valve device 16 and the connected volume reservoir 77 is accordingly reduced, fluid under pressure flowing from the piston chamber 67 through the pipe and passage 76, and from the volume reservoir 77 through the pipe 79 and past the unseated check valve 81, to the chamber 264 of the pneumatic valve device 254, thence past the open valve seat 267, through chamber 257, and passage and pipe 258 to the stop reservoir 305.

The piston 66 of the application valve device is accordingly shifted in the right-hand direction by the higher pressure in the slide valve chamber 68 into contact with the gasket seat 69, the slide valve 71 being accordingly shifted in the right-hand direction into application position.

As will be apparent in Fig. 2, with the slide valve 71 in application position, a cavity 595 in the slide valve 71 connects passage and pipe 296 to the passage and pipe 211 while the passage and pipe 238 is connected by a cavity 596 to an exhaust port and passage 598 opening at the seat of the slide valve 71.

Fluid under pressure is accordingly vented from the chamber 237 of the double check valve device 30 and the chamber 469 of the interlock switch 40 through the pipe and passage 238, cavity 596 and exhaust port and passage 598, the valve piston 232 of the double check valve device being accordingly shifted upwardly by the pressure in the passage 236 into seated relation on the upper gasket seat 248 and the interlock switch 40 being actuated to circuit-opening position. At the same time, fluid under pressure is supplied from feed valve No. 2 through the pipe and passage 296, cavity 595 in slide valve 71, passage and pipe 211, cavity 221 in the rotary valve 168 of the changeover valve device 26 and passage and pipe 209 to the chamber 241 at the lower side of the valve piston 233 of the check valve device 30. Since the pressure in the chamber 237 has been released, and the valve piston 232 shifted upwardly, valve piston 233 is accordingly shifted upwardly, by the higher pressure of the fluid supplied to the chamber 241, into contact with the gasket seat 249 and establishes communication from the chamber 241 through the lower ports 243, and annular chamber 242, to the control pipe 244 and chamber of the pneumatic switch device 28. The pneumatic switch device 28 then operates in the manner previously described to effect a straight-air application of the brakes to a degree determined by the pressure of the fluid supplied to the chamber 507. Feed valve No. 2 is so designed as to regulate the pressure of the fluid supplied to the pipe 296 and accordingly to the chamber 507 of the pneumatic switch device 28 to a certain pressure, such as sixty pounds per square inch, and consequently the pressure attained in the brake cylinder by straight-air in the train control application of the brakes in a corresponding pressure. The brake equipment on the cars operating in high-speed service is such that for brake cylinder pressures of, for example, sixty pounds per square inch, a braking ratio such as one hundred and fifty per cent is effected, which braking ratio is insufficient to cause sliding of the wheels as the train diminishes in speed under the application of the brakes.

When in application position, the slide valve 71 of the application valve device 16 uncovers at the left-hand end thereof, the port and passage 326 into which fluid under pressure from the slide valve chamber 68 is accordingly supplied. Fluid under pressure supplied into the pipe 326 flows to the chamber 523 of the sander valve device 54 and the piston 522 is accordingly actuated downwardly to unseat the valve 525 and seat the valve 526. The valve 526, when seated, cuts off the supply of fluid under pressure to the sanding reservoir from the feed valve pipe 15 through the branch pipe 532 and the valve 525, when unseated, opens communication for the supply of fluid under pressure from the sanding reservoir 55 to the sander device 56 as previously described, sanding of the rails being accordingly effected.

Fluid under pressure supplied to the pipe 326 flows into the branch pipe 325 and thus to the chamber 319 of the suppression valve device 37 where it acts on the right-hand face of the diaphragm 316 to urge it in the left-hand direction thus assisting the spring 322 in maintaining the double beat valve 304 seated on the valve seat 313 and unseated from the valve seat 314 to maintain the communication from the venting pipe 258 to the stop reservoir 305. At the same time also, fluid under pressure is supplied from the branch pipe 325 through another branch pipe 601 to one side of a double check valve 602 which is similar in construction to the double check valve device 478. The valve piston 603 of the double check valve 602 is accordingly shifted in the left-hand direction by the pressure of the fluid supplied into the pipe 601 to establish communication through the double check valve 602 from the pipe 601 to a pipe 604 leading to an engine cut-off device. The opposite end of the double check valve 602 has a pipe 605 connected thereto which is supplied with fluid under pressure from the usual safety control pipe. Thus upon the supply of fluid under pressure to the pipe 605 under the control of the well known deadman emergency valve devices, not shown, the valve piston 603 is shifted in the right-hand direction to establish communication for the supply of fluid under pressure from the pipe 605 to the pipe 604 leading to the engine cut-off device, not shown.

With the slide valve 71 of the application valve device 16 in application position, cavity 111 therein connects the passage 112 leading from the chamber 108 at the outer face of the piston 99 of the cut-off valve device 64 to the exhaust port or passage 114, and the cavity 207 therein connects the passage 87 to the passage and pipe 193.

Due to the venting of fluid under pressure from the chamber 108 at the outer face of the piston 99 of the cut-off valve device 64 through exhaust port 114, the pistons 98 and 99 are shifted in the right-hand direction against the force of the spring 113 by the pressure maintained in the chamber 107 at the outer face of the piston 98, the gasket 115 on the piston 98 being thus seated on the annular rib seat 116 to close off the connection between the pipe and passage 106 with the chamber 102 and the brake pipe 17 through the passage 104. It will be noted that leakage of fluid under pressure to the brake pipe 17 from the feed valve pipe 15 and passage 106 takes place through the choke passage 105, which leakage is unobjectionable. In the present instance, choke passage 105 serves no useful purpose, the useful function thereof being made apparent hereinafter.

The connection established between the passages 87 and 193 by the cavity 207 in the slide valve 71 causes a communication to be established through which fluid under pressure is vented from the equalizing reservoir 86 and the equalizing chamber 85 to the reduction limiting reservoir No. 1, the pipe and passage 179 through which fluid under pressure is vented from the reduction limiting reservoir being lapped at the seat of lower rotary valve 148 with the brake valve handle 154 in lap position, as it is.

The reduction limiting reservoir No. 1 is of such a capacity that when employed alone and cut off from reduction limiting reservoir No. 2 by the cut-off valve 191 as shown in Fig. 1, the pressure reduction in the equalizing reservoir 86 and equalizing chamber 85 produced by the equalization of pressures in equalizing reservoir 86, equalizing chamber 85 and reduction limiting reservoir No. 1 causes such operation of the equalizing discharge valve 63 as to reduce the normal brake pipe pressure a limited amount and thus produce or cause operation of the brake control valve device 21 to supply fluid under pressure from the auxiliary reservoir 22 to the double check valve device 478 to a pressure which is less than the maximum pressure, as determined by the pressure of fluid supplied to pneumatic switch 28 from feed valve No. 2, of the fluid supplied from the supply reservoir 31 into the straight-air pipe 32, and through the double check valve 478 to the brake cylinder 19. Since the straight-air application of the brakes is effected more rapidly than the automatic operation of the brake equipment, fluid under pressure previously supplied to the brake cylinder 19 from the straight-air pipe 32 maintains the valve piston 479 of the double check valve 478 in its lower seated position against the pressure of the fluid supplied from the brake control valve device 21 through the pipe 477. It will thus be seen that if for some reason or other the supply of fluid under pressure from the straight-air pipe 32 to the brake cylinder should fail, the pressure in the pipe 477 would become effective to immediately shift the valve piston 479 to its upper seat 482 and establish communication through which fluid under pressure is supplied from the auxiliary reservoir 22 to the brake control valve device 21, pipe 477, double check valve device 478 to the brake cylinder 19 to maintain the application of the brakes.

It will accordingly be seen that with the driving power for the train cut off and the brakes applied as just described, the train will be brought to a complete stop.

The passage 78 through which fluid under pressure is vented from the piston chamber 67 of the application valve device 16 has a branch passage 598 which opens at the seat 79 of the slide valve 71, and in the application position of the slide valve 71 the cavity 597 in the slide valve connects the branch passage 598 to the passage and pipe 181 leading to and opening at the seat 151 of the lower rotary valve 148 of the brake valve device 25. With the operating handle 154 of the brake valve device 25 in lap position, the passage 181 is lapped at the seat 151 of the lower rotary valve 148 and thus after a certain predetermined time determined by the size of the choke port 74 in the piston 66, which time however is longer than that required to bring the train to a complete stop, the continued supply of fluid under pressure from the slide valve chamber 68 through the choke port 74 to the piston chamber 67 and its connected volume reservoir 77 as well as to the stop reservoir 305 which is at this time connected to the piston chamber 67, as previously described, restores the pressure in the piston chamber 67 to the pressure in the slide valve chamber 68. The spring 75 thus becomes effective to shift the piston 66 and accordingly the slide valve 71 in the left-hand direction back to the normal position thereof shown in Fig. 2.

With the slide valve 71 of the application valve device restored to its normal position as just described, chamber 108 at the outer face of the piston 99 of the cut-off valve device 64 is again connected to the chamber 107 through cavity 111 in the slide valve so that the spring 113 becomes effective to shift the pistons 98 and 99 in the left-hand direction to the normal position shown, wherein the piston 98 is unseated from the annular rib seat 116 to again open the passage 104 through which fluid under pressure is supplied from the feed valve pipe 15 through passage and pipe 106 to recharge the brake pipe 17. Recharge of the brake pipe causes the brake control valve device 21 to operate in the usual manner to recharge auxiliary reservoir 22 and to vent fluid under pressure to atmosphere from the pipe 477 leading to the double check valve 478. At the same time, communication is restored through which fluid under pressure is again supplied from the feed valve pipe 15 through the passage and pipe 206, cavity 207 in the slide valve 71, and passage 87 to the equalizing reservoir 86 and equalizing chamber 85 to cause the equalizing discharge valve device 63 to close.

With the slide valve 71 in normal position, the port 239 in the slide valve again registers with the passage 238 and fluid under pressure is thus again supplied from the slide valve chamber 68 through the passage and pipe 238 to the chamber 469 of the interlock switch 40 and to the chamber 237 of the double check valve device 30. The interlock switch 40 is accordingly actuated to circuit-closing position again and since the pressure supplied from the feed valve pipe 15 to the chamber 237 of double check valve device 30 is higher than the pressure supplied to the chamber 241 and existing in chamber 241, the two valve pistons 232 and 233 are shifted downwardly into engagement with the gasket seats 246 and 247 respectively. The control pipe 244 is thus reconnected through the double check valve 30 to the pipe and passage 208, which in the straight-air position of the rotary valve 168 of the change-over valve device 26 is connected to passage 173 which is lapped at the seat 149 of the upper rotary valve 147. At the same time also, the control pipe 244 is connected through the double check valve device 30 to the pipe and passage 123. However, since the pressure of the fluid in the control pipe 244 and chamber 507 of the pneumatic switch device 28 is sufficient to overcome the tension of the spring 121 of the insuring valve device 65 of the application valve device 16, the pressure of the fluid supplied from the control pipe 244 to the pipe and passage 123 is sufficient to shift the piston valve 118 in the right-hand direction to seated relation on the gasket seat 135 and thus establish communication, as previously described, to the suppression pipe 196 and chamber 317 of the suppression valve device 37. Pressure in the chamber 317 is thus effective to overcome the tension of the spring 322 and to cause shifting of the double beat valve 304 to seated relation on the valve seat 314 and establish connection from the stop reservoir 305 past the open seat 313, through chamber 319, pipe 325, choke passage 332, pipe and passage 326, and cavity 328 in the slide valve 71 to the exhaust port and passage 327 so that the pressure in the stop reservoir 325 is slowly vented to atmosphere. The choke passage 332 prevents such a build-up of pressure in the pipes 325 and 326 as would again effect operation of the sander valve device 34 to cause sanding of the rails and the operation of the engine-cut-off device to cut off the driving engine of the train.

Fluid under pressure supplied from the suppression pipe 196 to the chamber 553 of the suppression switch 46 is also effective to actuate the contact member 556 of the switch to circuit-closing position. However, in the present instance, without operation of the acknowledging valve 41 to acknowledging position, as will be hereinafter more clearly explained, the actuation of the suppression switch to circuit-closing position is without effect.

With the slide valve 71 of the application valve device 16 restored to its normal position, the supply of fluid under pressure from the feed valve No. 2 through pipe and passage 296, cavity 595 in the slide valve 71 and passage and pipe 211 to the chamber 241 of the double check valve 30 is cut off, since the passage 211 is lapped at the seat of the slide valve 71. However, since as has been just explained, the pressure in the control pipe 244 and in the chamber 507 of the pneumatic switch device 28 is maintained, the application of the brakes is consequently maintained.

*(g) Release of the brakes following a train control application by straight-air*

The brakes may be released, following a train control application of the brakes by straight-air operation produced in the manner just described, by shifting the handle 154 of the brake valve device to release position wherein the upper rotary valve 147 of the brake valve device 25 establishes communication through which fluid under pressure is vented from the chamber 507 of the pneumatic switch device 28 and the control pipe 244 to atmosphere, the fluid under pressure flowing from the control pipe 244 and connected chamber 507, through annular chamber 242 of the double check valve device 30, upper ports 243, passage 236, pipe and passage 208, cavity 218 of the rotary valve 168 of the changeover valve device 26, passage 173, cavity 215 of the upper rotary valve 147 of the brake valve device 25, passage 172, cavity 223 of the rotary valve 168, and the exhaust port and passage 212.

Upon the release of fluid under pressure from the chamber 507 of the pneumatic switch device 28, the magnet valve mechanism 29 is automatically controlled to effect release of fluid under pressure from the brake cylinder 19 and accordingly to effect the complete release of the brakes, assuming that the magnet valve device 255 of timing valve mechanism 34 has in the meantime been reenergized due to the fact that a warning or stop signal is no longer being received by the track signal apparatus 35.

If the magnet valve device 255 of the timing valve mechanism 34 remains deenergized at the time the operator endeavors to release the brakes as just described, a train control application of the brakes will again be initiated, since the chamber 317 of the suppression valve device 37 is vented to atmosphere through the suppression pipe 196, passage 183, cavity 216 of the lower rotary valve 148 of the brake valve device 25, and exhaust port and passage 184, so that fluid under pressure from the piston chamber 67 of the application valve device 16 is again vented to the stop reservoir 305 and slide valve 71 actuated to application position.

(h) *Adequate manual automatic application of the brakes causing suppression of train control application*

Assuming that the rotary valve 168 of the changeover valve device 26 is in the automatic position thereof and that the engineman chooses to effect application of the brakes by manual operation upon the reception of a danger or stop signal by the track signal apparatus 35, he may operate the handle 154 of the brake valve device to the service application position thereof to effect an automatic application of the brakes by automatic operation, that is, by reducing the pressure in the brake pipe 17, in the manner previously described.

As previously indicated, with the rotary valve 168 of the changeover valve device 26 in automatic position, operation of the operating handle 154 of the brake valve device 25 to service position causes fluid under pressure from the rotary valve chamber 143 to be supplied, in the same manner as for manual straight-air operation, through the port 584 in the lower rotary valve 148, passage 183 and suppression pipe 196 to the suppression valve device 37 and suppression switch 46.

The suppression valve device 37 then functions in the manner previously described to suppress venting of the fluid under pressure from the piston chamber 67 of the application valve device 16 to the stop reservoir 305.

At the same time, with the rotary valve 168 of the changeover valve device 26 in automatic position, fluid under pressure is supplied from the rotary valve chamber 143, through the port 584, passage 183, passage 196, cavity 593 in the rotary valve 168 into the passage and pipe 213, while fluid under pressure vented from the chamber 95 of the equalizing discharge valve device 63 into the pipe and passage 213 causes charging of the timing reservoir No. 1. Following the return of the operating handle 154 of the brake valve device 25 to lap position, when the desired degree of service application has been effected and assuming that a reduction in the brake pipe 17 sufficient to cause the feed valve pipe pressure in chamber 353 of the reduction insuring valve device 39 to shift the double beat valve 337 into seated relation on the valve seat 350 has been effected, the pressure in the timing reservoir No. 1 is effective to maintain the pressure in the chamber 317 of the suppression valve device 37 and in the chamber 553 of the suppression switch 46, the pressure from the timing reservoir No. 1 being transmitted through branch pipe 364, pipe 213, through the restricted passage 365, cavity 593 in the rotary valve 168, suppression pipe and passage 196, to the chamber 317 of the suppression valve device 37 and the chamber 553 of the suppression switch 46.

The suppression valve device 37 is accordingly effective to suppress a train control application of the brakes which would otherwise result due to deenergization of the magnet valve device 255 of the timing valve mechanism 34.

(i) *Inadequate manual automatic application of the brakes resulting in a train control application*

Let it be assumed, however, that the degree of the service application effected by manual automatic operation corresponds to a reduction in the pressure in the brake pipe 17 which is insufficient to enable the feed valve pressure in the chamber 353 of the reduction insuring valve device 39 to shift the double beat valve 337 into seated relation on the valve seat 350. In such case, upon the return of the operating handle 154 of the brake valve device to lap position, communication is established through which the chamber 317 of the suppression valve device 37 and the chamber 553 of the suppression switch 46 is vented to atmosphere, this communication extending through the suppression pipe and passage 196, cavity 593 in the rotary valve 168, passage and pipe 213, restricted passage 365 in the pipe 213, branch passage 338, passage 339, chamber 336 of the reduction insuring valve device 39, past the open valve seat 350, through the bore 342, chamber 343 and atmospheric port 344. As a result, when the pressure in the chamber 317 of the suppression valve device 37 is sufficiently reduced, the spring 322 becomes effective to shift the diaphragm 316 in the left-hand direction and thus permit the spring 310 to shift the double beat valve 304 into seated relation on the valve seat 313 and unseat the valve 304 from the valve seat 314. The communication is thus established from the venting pipe 258 leading from the timing valve mechanism 34 to the stop reservoir 305 and, the magnet valve device 255 being deenergized due to the danger or stop signal being received by the track signal apparatus 35, fluid under pressure is accordingly vented from the piston chamber 67 and connected volume reservoir 77 through the venting pipe and passage 258 to the stop reservoir 305.

Accordingly the piston 66 and slide valve 71 of the application valve device 16 are shifted to application position.

Since the pipe and passage 211 is lapped at the seat 169 of the rotary valve 168 of the changeover valve device 26, fluid under pressure cannot be supplied from the feed valve No. 2 to the chamber 241 of the double check valve device 30, as when the rotary valve 168 was in straight-air position. However, the pipe and passage 238 leading from the chamber 237 of the double check valve device 30 and the chamber 469 of the interlock switch 40 is vented to atmosphere through the cavity 596 in slide valve 71 and exhaust port and passage 598 the same as in the case of a train control application of the brakes by straight-air operation. Also, as in the case of the train control application by straight-air, fluid under pressure is supplied from the slide valve chamber 68 through the pipe and passage 326 to effect operation of the sander valve device 54 to cause sanding of the rails and to supply fluid under pressure to the engine cut-off device by way of the double check valve device 602 to cause cut off of the driving engine.

Furthermore, in a manner similar to that previously described in the case of a train control application by straight-air operation, the chamber 108 at the outer face of the piston 99 of the cut-off valve device 64 is vented to atmosphere through the cavity 111 in the slide valve 71 and exhaust port and passage 114. At the same time, the equalizing reservoir 86 and equalizing chamber 85 are equalized through the cavity 207 in the slide valve 71 and passage and pipe 193 including the choke 194, and pipe 189 to the reduction limiting reservoir No. 1, the exhaust communication from which, through the pipe and passage 179, is lapped at the seat of the lower rotary valve 148 of the brake valve device 25. As a result of venting chamber 108, the piston 98 of the cut-off valve device 64 is shifted in the right-hand direction to seat on the annular rib seat 116 to cut off the connection between the passage 106 and the brake pipe 17 through the passage 104. The choke 194 so restricts the rate of flow of fluid under pressure from the equalizing reservoir 86 and equalizing chamber 85 to reduction limiting reservoir No. 1 that the pressure in the equalizing reservoir and equalizing chamber is reduced at a service rate. Consequently discharge valve 63 operates in well known manner to reduce brake pipe pressure at a service rate and brake control valve device 21 accordingly operates in well known manner to supply fluid under pressure to the brake cylinder 19 and thus effect a service application of the brakes.

Since the passage and pipe 106 is connected through the cavity 591 in the rotary valve 168 of the changeover valve device 26, in the automatic position thereof, to the passage 172 which is lapped at the seat 149 of the upper rotary valve 147 of the brake valve device 25 in the lap position thereof, it will be seen that fluid under pressure at the pressure in the feed valve pipe would be trapped in the pipe and passage 106 except for the connection between the pipe and passage 106 with the brake pipe 17 through the choke passage 105. It follows, therefore, that the pressure of the fluid trapped in the pipe and passage 106 is reduced by leakage through the choke passage 105 into the brake pipe 17, as the pressure in the brake pipe 17 is reduced by the operation of the equalizing discharge valve device 63 caused by the reduction in the pressure in equalizing reservoir 86 and equalizing chamber 85.

Operation of the brake control valve device 21 is effected, in the usual manner, upon the reduction in brake pipe pressure to cause fluid under pressure to be supplied from the auxiliary reservoir 22 to the brake cylinder 19 to effect a service application of the brakes to a degree in accordance with the total reduction in brake pipe pressure effected. Due to the fact that a partial reduction in brake pipe pressure was effected by the operation of the brake valve device 25 to effect an inadequate degree of service application for suppressing the train control application, which reduction was effected in the manner previously described by venting of fluid under pressure through the choke 177 of the brake valve device 25, the reduction in the pressure in the equalizing reservoir and equalizing chamber by venting into the reduction limiting reservoir No. 1 produces a total reduction in brake pipe pressure which is greater than if the reduction were made from the normal standard high brake pipe pressure carried for trains equipped with high speed brake equipment. The reduction limiting reservoir No. 1 is, however, of such capacity as to limit the degree of reduction in brake pipe pressure as a result of the operation of the application valve device 16 to effect a train control application of the brakes that little or no sliding of the wheels will occur as the speed of the train diminishes under the application of the brakes.

In the copending application Serial No. 741,063 of Ellis E. Hewitt referred to above, an inertia type of retardation controller device is employed which is effective only for straight-air applications of the brakes to automatically reduce brake cylinder pressure as the speed of the train diminishes under the application of the brakes to maintain a substantially constant rate of retardation and to prevent sliding of the wheels. In the brake control equipment shown and described herein, a retardation controller device of the type shown and described in the copending application Serial No. 741,063 is omitted for the sake of simplicity but it will be understood that in the practical form of the brake control equipment embodying my invention some form of retardation controller device may be employed to perform a similar function. It follows, therefore, that in the case of train control applications of the brakes by straight-air operation, the problem of preventing sliding of the wheels has been taken care of. However, since the retardation controller device is not effective to control brake cylinder pressure to relieve brake cylinder pressure in the case of train control applications by automatic operation, it is necessary that some means be provided to in some way limit the brake cylinder pressure so as to prevent sliding of the wheels, and it will therefore be apparent that the reduction limiting reservoir No. 1 functions to effect this result by limiting the maximum brake cylinder pressure attainable, in the case of train control applications by automatic operation, to a pressure which will permit the continued application of the brakes, without diminution in brake cylinder pressure, so that little or no sliding of the wheels will result.

As in the case of the train control application by straight-air operation, the piston chamber 67 and the connected volume reservoir 77 and stop reservoir 305 are eventually recharged with fluid under pressure equal to the pressure in the feed valve pipe by flow of fluid under pressure from the slide valve chamber 68 through the choke port 74 in the piston 66 of the application valve device 16, and accordingly the piston 66 and slide valve 71 are shifted back to the normal position thereof by the spring 75. Similarly, as previously described in the case of such return of the piston 66 and slide valve 71 to normal position thereof, the chamber 108 at the outer face of the piston 99 of the cut off valve device 67 is reconnected through the cavity 111 in the slide valve 71 to the chamber 107 at the outer face of the piston 98 and consequently the spring 113 becomes effective to shift the pistons 98 and 99 of the cut-off valve device 64 in the left-hand direction to the normal position shown. The piston 98 is thus unseated from the annular rib seat 116 and the connection from the pipe and passage 106 to the brake pipe 17 through the passage 104 is again restored. The purpose of providing the choke passage 105 should now be understood for the reason that but for the provision of the choke passage 105, which permits leakage of the fluid trapped at the pressure of feed valve pipe 15, from the pipe and passage 106 to the brake pipe 17, the unseating of the piston 98 from the annular rib seat 116 as just described would result in a momentary surge or increase of pressure in the brake pipe 17. The momentary increase of pressure might be sufficient to cause operation of the brake control valve devices 21 at least on the first few cars of the train to release position, so that an undesired release of the brakes would be effected at the time that the application of the brakes is intended to be and should be maintained. The restoration of the connection by the cavity 207 in the slide valve 71 from the passage 87 leading to the equalizing chamber 85 and equalizing reservoir 86 to the passage and pipe 203 is ineffective, however, to cause recharging of the equalizing reservoir 86 and equalizing chamber 85 to the pressure in feed valve pipe 15, since pipe and passage 203 is connected through the cavity 588 in the rotary valve 168 of the changeover valve device 26 to the passage 174, which is connected, in the lap position of the operating handle 154, through cavity 581 of the upper rotary valve 147 to the passages 175 and 176, which are in turn respectively lapped at the seat of the rotary valve 168 in the automatic position thereof and connected to the atmospheric exhaust port 212 through cavity 592 in rotary valve 168.

The application of the brakes is accordingly maintained until released in the manner to be described presently.

*(j) Release of the brakes following a train control application by automatic operation*

Upon the operation of the equalizing discharge valve device 63 to vent fluid under pressure from the brake pipe 17, the fluid under pressure supplied through the pipe 213 and check valve device 361 is effective to charge the timing reservoir No. 1, the pressure thus built up in the timing reservoir No. 1 being effective through the pipe 213, cavity 593 in the rotary valve 169 of the changeover valve device 26 and suppression pipe and passage 196 in the chamber 317 of the suppression valve device 37 to unseat the double beat valve 304 from the valve seat 313 and shift it into seated relation on the valve seat 314. The stop reservoir 305 is accordingly vented to atmosphere past the open valve seat 313 and through chamber 319, pipe 325, restricted passage 332, pipe and passage 326, cavity 328 in the slide valve 71 and exhaust port 327 in the manner previously described.

In the event, therefore, that the operator endeavors to release the brakes by returning the operating handle 154 of the brake valve device 125 to release position while the magnet valve device 255 of the timing valve mechanism 34 is deenergized under the control of the track signal apparatus 35, the release of fluid under pressure from the chamber 317 of the suppression valve device 37 through the suppression pipe and passage 196, passage 183, cavity 216 in the lower rotary valve 148 of the brake valve device 25 and exhaust port and passage 184 causes the spring 322 of the suppression valve device 37 to again shift the diaphragm 316 in the left-hand direction and permit the spring 310 to unseat the double beat valve 304 from the valve seat 314 and to shift it into seated relation on the valve seat 313. The connection from the venting pipe 258 leading from the timing valve mechanism 34, to the stop reservoir 305 past the open valve seat 314 is thus effected. Accordingly, the pressure in the piston chamber 67 of the application valve device 16 is reduced by flow to the stop reservoir 305 in the manner previously described, and the piston 66 and the slide valve 71 are again shifted in the right-hand direction into application position to effect reapplication of the brakes.

If the danger or stop signal is no longer received by the track signal apparatus 35 and the magnet valve device 255 of the timing valve mechanism 34 is accordingly again energized, return of the operating handle 154 of the brake valve device 25 to release position from the lap position thereof under the circumstances previously described will result in the recharging of the brake pipe 17 and of the equalizing reservoir 86 and equalizing chamber 85 as previously described. However, since the magnet valve device 255 is maintained energized, the pressure of the fluid supplied to the chamber 261 of the pneumatic valve device 254 and its connected timing reservoir No. 2 maintains the double beat valve 256 of the pneumatic valve device 254 in its seated position on the upper valve seat 267 and thus reduction in the pressure of the fluid in the piston chamber 67 of the application valve device 16 and the connected volume reservoir 77 will not occur. Accordingly, upon the complete restoration of the standard normal pressure in the brake pipe 17, the brake control valve device 21 will effect full recharging of the auxiliary reservoir 22 and the complete release of fluid under pressure from the brake cylinder 19 to effect complete release of the brakes.

*(k) Suppression of train control application by operation of acknowledging valve device*

If, upon the reception of a danger or stop signal by the track signal apparatus 35, with the consequent deenergization of the electromagnet 284 of the magnet valve device 255 and energization of the electromagnet 392 of the acknowledging cut-off magnet valve device 45, the operator is sufficiently on the alert and desires to suppress a train control application of the brakes without effecting application of the brakes manually, either by straight-air or automatic operation, he may operate the handle 375 of the acknowledging valve device 41 to acknowledging position and then, after an interval of time insufficient to cause complete discharge of the acknowledging reservoirs No. 1 and No. 2, return it to normal charging position and back to acknowledging position again repeatedly thereby causing the acknowledging switch 44 to remain in circuit-closing position.

Assuming that the operator causes the acknowledging switch 44 to be actuated to circuit-closing position within the time interval permitted by the timing valve mechanism 34, the closing of the acknowledging switch 44 completes a circuit through the interlock switch 40 for energizing a relay, not shown, included in the track signal apparatus 35 which is effective to cause cessation of the audible signal, indicating the reception of the danger or stop signal, and also reenergization of the electromagnet 284 of the magnet valve device 255.

Consequently, the magnet valve device 255 is actuated to the position shown, wherein the chamber 261 of the pneumatic valve device 254 and the connected timing reservoir No. 2 continue to be charged with fluid under pressure from the feed valve No. 3, thus preventing the reduction of pressure in the piston chamber 67 of the application valve device 16 and the connected volume reservoir 77 past the double beat valve 256 of the pneumatic switch device 254.

As long as the operator continues to fan the operating handle 375 of the acknowledging valve device 41 to maintain the acknowledging switch 44 in circuit-closing position, the magnet valve device 255 of the timing valve mechanism 34 will be maintained energized and thus the train control application of the brakes will be effectively suppressed.

Instead of fanning the acknowledging valve handle 375 to maintain the electromagnet 284 of the magnet valve device 255 energized at the time a danger or stop signal is being received by the track signal apparatus 35, the operator may, after one operation of the acknowledging valve to acknowledging position, immediately effect an application of the brakes, either by straight-air operation or by automatic operation, by shifting the operating handle 154 of the brake valve device 25 to service position to effect application of the brakes in the manner previously described, to a degree sufficient to suppress a train control application of the brakes, fluid under pressure being accordingly supplied, as previously indicated, from the rotary valve chamber 143 through a port 586 in the lower rotary valve 148, passage 183, and suppression pipe 196 to the suppression valve device 37 and suppression switch 46.

The suppression valve device 37 is then operated as before described to shift the double beat valve 304 into engagement with the valve seat 314 and cut off the connection between the venting pipe 258 from the timing valve device mechanism 34 to the stop reservoir 305 and thus prevent venting of the piston chamber 67 of the application valve device 16 resulting in operation of the piston 66 and the slide valve 71 to application position.

At the same time, assuming the acknowledging valve device 41 to have been operated at least once to acknowledging position to actuate the acknowledging switch 44 to circuit-closing position, the closing of the suppression switch 46 completes a self-holding circuit for the relay, not shown, of the track signal apparatus 35, which relay previously referred to, is originally energized upon the actuation of the acknowledging switch 44 to circuit-closing position. This relay, as previously explained, causes the electromagnet 284 of the magnet valve device 255 to be energized, despite the fact that the track signal apparatus 35 is receiving a danger or stop signal and at the same time completes the circuit for energizing a magnet valve device, not shown, to cause the cessation of the audible signal which would otherwise be given when the train is in a track block within which the track signal apparatus 35 receives a danger of stop signal.

It will be seen, therefore, that the suppression switch 46 serves two purposes, firstly to cause cessation of the audible signal given by a suitable device (not shown) which is included in the track signal apparatus 35 and secondly, to prevent the venting of fluid under pressure from the chamber 261 of timing valve mechanism 34 and the connected timing reservoir No. 2 by causing the electromagnet 284 of the magnet valve device 255 to remain energized. Thus, the pneumatic valve device 254 of timing valve mechanism 34 is not operated to connect the pipe and passage 78 leading from the piston chamber 67 of the application valve device 16 to the venting passage and pipe 258. Suppression of the train control application is accordingly caused by the magnet valve device 255 being maintained energized, without regard to the effect of the suppression valve device 37. It will be evident that, in the event of failure of the electrical circuit whereby the suppression switch 46 is effective to maintain the magnet valve device 255 energized under the circumstances just described, the train control application will be suppressed due to the operation of the suppression valve device 37. The suppression valve device 37 acts, in the particular instance just described, to back-up and insure the suppression of the train control application.

(*l*) *Train control application of the brakes with no attempt at suppression*

Let it be supposed that for some reason, such as inattention, the operator of the train permits a warning or stop signal received by the track signal apparatus 35 to go unheeded, without attempting a manual application of the brakes, either by straight-air or by automatic operation, or without causing suppression of a train control application by operation of the acknowledging valve device 41. In such case, the timing valve mechanism 34 is effective, upon the elapse of the time interval determined thereby, to vent fluid under pressure from the piston chamber 67 of the application valve device 16 to produce a train control application of the brakes either by straight-air or automatic operation, in the manner previously described, depending upon whether the rotary valve 168 of the brake valve changeover valve device 26 is in straight-air position or automatic position. It will be apparent that, once the slide valve 71 of the application valve device 16 is shifted to application position, the operator is unable to suppress the train control application, that is to prevent it from going through to completion, by operation of the handle 375 of the acknowledging valve device 41 to acknowledging position, because the venting of the fluid under pressure from the pipe 238 due to the shifting of the slide valve 71 to application position, actuates the interlock switch 80 to circuit-opening position, and thus renders the closing of the acknowledging switch 44 ineffective.

Obviously, with the chamber 317 of the suppression valve device 37 and chamber 553 of the suppression switch 46 remaining vented to atmosphere through the suppression pipe 196, passage 183, cavity 216 in the lower rotary valve 148 of the brake valve device 25 and exhaust port and passage 184, the suppression valve device 37 remains conditioned, as shown in Fig. 2, to permit venting of fluid under pressure from the piston chamber 67 to the stop reservoir 305. Reenergization of the electromagnet of the magnet valve device 255 of the timing valve mechanism 34 by the suppression switch 46 is not effected.

With the operating handle 154 of the brake valve device 25 in release position and the lower rotary valve 148 accordingly positioned as shown in Fig. 1, the piston chamber 67 remains connected to atmosphere by way of the passage 78, branch passage 590, cavity 597 in the slide valve 71, passage and pipe 181, passage 216 in the lower rotary valve 148 of the brake valve device 25, and exhaust port and passage 184. It will thus be apparent that once the slide valve 71 is shifted to application position, it remains in the application position and does not return to the normal position thereof, as in previous instances of train control applications following inadequate degrees of application of the brakes by manual operation of the brake valve device 25, for the reason that the fluid under pressure in the piston chamber 67 of the application valve device 16 continues to be reduced by flow through the port and passage 184 of the brake valve device 25 faster than it can be supplied from the slide valve chamber 68 through the choke port 74 in the piston 66.

Furthermore, due to the fact that the reduction limiting reservoir No. 1 remains vented to atmosphere through the pipe and passage 179, passage 216 in the lower rotary valve 148 of the brake valve device 25, and exhaust port and passage 184, the reduction in the pressure of fluid vented from the equalizing reservoir 86 and equalizing chamber 85 to the reduction limiting reservoir No. 1 by way of the cavity 207 in the slide valve 71, passage and pipe 193, is unlimited, as compared to the previously described operation wherein the brake valve handle 154 and accordingly the lower rotary valve 148 is positioned in lap position to lap the pipe and passage 179. The brake pipe 17 is thus substantially completely vented to cause the brake control valve device 21 to operate to effect a full service application of the brakes. Incidentally, the time required to completely recharge the brake pipe, upon release of the brakes, as described presently, is a penalty, which is reflected in the increase over scheduled time between two stations.

In order to release the brakes following a train control application of the brakes as just described, assuming that the track signal apparatus 35 no longer receives a warning or stop signal and that the magnet valve device 255 of timing valve mechanism 34 is again energized, it is necessary to first shift the operating handle 154 of the brake valve device 25 from release position to lap position to lap the passage 181 at the seat of the lower rotary valve 148. The fluid pressure may thus again be built up in the piston chamber 67 of the application valve device 16 from the slide valve chamber 68 through the choke port 74 in the piston 66 to cause return of the slide valve 71 of the application valve device 16 to its normal position. With rotary changeover valve 168 in straight-air position, the equalizing reservoir 86, equalizing chamber 85 and brake pipe 17 are thus automatically recharged, release of the brakes being effected by returning the operating handle 154 to release position. With the rotary changeover valve 168 in automatic position, recharging of equalizing reservoir 86, equalizing chamber 85, and brake pipe 17 to effect complete release of the brakes is produced upon return of brake valve handle 154 to release position.

*(m) Operation of system changeover valve*

Let it be assumed that the train passes from a stretch of track provided with a so-called continuous track signal system, over which the brake control equipment operates in the manner previously described, to a stretch of track which is equipped with a so-called intermittent track signal system. In a so-called intermittent track signal system, there are signal devices spaced at intervals along the track, such as at intervals of one mile, which are actuated responsively to the presence of a train in a track block section guarded by the signal devices to indicate the presence of the train in the track block, there being no signal lamp or other indicating device in the cab of the train to indicate the condition of the track ahead of the train as in the continuous track signal system. Furthemore, in an intermittent track signal system, a danger or stop signal is received on the train only as the train passes a track block signal device and not continuously as in the continuous track signal system.

It is, therefore, desirable in the case of the so-called intermittent tract signal system, to permit suppression of a train control application by operation of the acknowledging valve device 41, prior to the reception of a danger or warning signal in order to avoid the penalty of unnecessary slow-down in speed incident to a train control application of the brakes. Accordingly, when the train enters the stretch of track equipped with the intermittent track signal system, the operator operates a suitable manually operable changeover switch, not shown, which is included in the track signal apparatus 35, to interrupt the circuit for energizing the electromagnet 434 of the changeover magnet valve device 52.

As a result of the deenergization of the electromagnet 434 of magnet valve device 52, fluid under pressure is vented from the piston chamber 412 of the system changeover valve device 51 and from the chamber 448 of the changeover switch 53 to atmosphere by way of the pipe 416, chamber 437 of the changeover magnet valve device 52, past the unseated valve 428 through chamber 431 and exhaust passage 438.

Changeover switch 53 is actuated as a result of venting of fluid under pressure from the chamber 448 thereof to separate the contact members 443 and 444 thereof from the contact fingers 445 and 446 and to shift them into engagement with the contact fingers 453 and 454, respectively, so that the electromagnet 392 of the acknowledging cut-off magnet valve device 45 is connected directly across the opposite terminals of the battery 463 through the wires 456 and 457, contact members 443 and 444 of the changeover switch 53 and wires 461 and 462. The acknowledging valve device 41 may thus be operated at any time to effect the closing of the acknowledging switch 44.

The system changeover valve device 51 is actuated as a result of venting of fluid under pressure from the chamber 412 thereof to the position previously described wherein it cuts off the timing reservoir No. 2 from the chamber 261 of the pneumatic valve device 254 and the acknowledging reservoir No. 2 from the acknowledging reservoir No. 1.

It will thus be seen that once the magnet valve device 255 of timing valve mechanism 34 is deenergized due to the reception of a danger or stop signal, only a relatively short interval of time elapses incident to the venting of the chamber 261 of the pneumatic valve device 254 and the consequent operation of pneumatic valve device 254 to establish the communication for venting the piston chamber 67 of the application valve device 16 to the stop reservoir 305 and thus cause a train control application of the brakes. It follows, therefore, that the operator must be on the alert to effect an adequate application of the brakes by manual operation of the brake valve device 25 or to operate acknowledging valve device 41 to cause suppression of a train control application of the brakes in advance of the reception of a danger or stop signal on the train.

Furthermore, since the capacity of the acknowledging reservoir No. 1 is smaller than the combined capacity of the two acknowledging reservoirs No. 1 and No. 2, and since the pressure of the fluid supplied to the acknowledging switch 44 by operation of the acknowledging valve device 41 will thus be reduced in a shorter time through the choke 49, the operator must fan the operating lever 375 of the acknowledging valve device 41 more frequently as compared to previously described situations, in order to suppress a train control application of the brakes.

(n) Feature whereby the brake control equipment on the locomotive may be conditioned to operate in a plurality of types of service The operation of the brake control equipment in the manner previously described, in which only the reduction limiting reservoir No. 1 is employed, contemplates the employment of the locomotive in high-speed service wherein the cars which are hauled are provided with braking equipment adapted to effect maximum application of the brakes at relatively high braking ratios, such as two-hundred and fifty or three-hundred per cent braking ratio.

The termn "braking ratio", as employed herein, designates the ratio of the total braking force in pounds acting on all of the brake shoes associated with the wheels of the car to the empty weight of the car. As previously explained, the reduction limiting reservoir No. 1 is of such capacity that for train control applications of the brakes by automatic operation, the reduction in brake pipe pressure is thereby so limited that the brake control valve device 21 effects a limited brake cylinder pressure corresponding for example, to a one-hundred and twenty-five a one-hundred and fifty per cent braking ratio, which braking ratio is insufficient, though maintained throughout the application, to cause sliding of the wheels on the cars, as the speed of the train diminishes under the application of the brakes.

In the event, however, that it is desired to have the locomotive haul standard passenger or freight cars equipped with (1) brake control apparatus adapted to operate on a normal brake pipe pressure of, for example seventy pounds per square inch, or (2) brake apparatus operating on normal brake pipe pressures substantially the same as the normal high brake pipe pressure of from one-hundred and ten to one-hundred and fifteen pounds per square inch for high-speed train service but adapted to effect lower braking ratios for equivalent brake cylinder pressures, or (3) brake apparatus operating on normal brake pipe pressures of, for example seventy pounds per square inch and effective to cause application of the brakes at lower braking ratios for equivalent brake cylinder pressures, the additional reduction limiting reservoir No. 2 is cut in.

The purpose of cutting in the additional reduction limiting reservoir No. 2 is to so increase the reduction limiting reservoir capacity over the capacity of reduction limiting reservoir No. 1, when employed alone, that the reduction in the pressure in equalizing reservoir and equalizing chamber by equalization into reduction limiting reservoirs No. 1 and No. 2 will be sufficient to produce a corresponding reduction in brake pipe pressure great enough to cause the brake control valve device 21 to operate to effect operation of the brake control devices on the cars, to effect a full or maximum service application of the brakes on the cars.

In present day standard passenger or freight cars, the number of brake cylinders employed and the leverage ratios are such that the braking ratio at which the application of the brakes for a full service application is effected is of the order of a ninety per cent ratio. Since, as has been previously explained, braking ratios up to one-hundred fifty per cent are considered satisfactory in that continued applications of the brakes at such ratio without diminution as the speed of the train decreases under the application of the brakes causes little or no sliding of the wheels, it follows that the cutting in of the additional reduction limiting reservoir No. 2 insures maximum service braking effect without danger of the sliding of the wheels, when the locomotive is employed to haul standard present day passenger or freight cars equipped with brake apparatus differing from the brake apparatus with which the cars, employed in high-speed train service, are provided.

Summary

Summarizing, it will be seen that I have provided a brake control equipment operative under manual control to effect optionally, the application of the brakes either by straight-air operation or by automatic operation, the equipment being adapted to be controlled automatically according to the track block signals translated to the moving train to effect train control applications of the brakes, either by straight-air operation or by automatic operation, depending upon whether the equipment is conditioned for straight-air operation or for automatic operation at the time the train control application is initiated.

It will, furthermore, be seen that I have provided acknowledging means for electrically suppressing a train control application and means associated therewith for preventing premature operation of the acknowledging means prior to the reception of a train control warning or stop signal on the train.

It will also be seen that I have provided means whereby a train control application may be pneumatically suppressed by the application of the brakes to a sufficient or adequate degree either upon manual straight-air application of the brakes or manual automatic operation of the brakes, together with insuring means effective either for straight-air operation or for automatic operation to cause a train control application of the brakes in the event that the application of the brakes by operation of the brake valve 25 is inadequate or insufficient following the reception of a train control signal on the train.

It will, furthermore, be seen that I have provided means whereby the brake control equipment may be adapted for operation in connection with two different types of track signal systems, familiarly known as the continuous system and the intermittent system.

A further feature of my invention is the provision of two reduction limiting reservoirs in the locomotive brake control equipment, only one of which reservoirs is employed when the locomotive is operated in high-speed train service to haul cars which are specially equipped with brake apparatus operating on a relatively high normal brake pipe pressure and effective to cause applications of the brakes by automatic operation at relatively high braking ratios. In such high-speed train service, the said one reservoir serves to limit the degree of reduction in brake pipe pressure effected during a train control application of the brakes by automatic operation to such a degree that the corresponding brake cylinder pressure effected on the cars is insufficient to cause sliding of the wheels on the cars as the speed of the train decreases under the application of the brakes.

The second reduction limiting reservoir is cut in when the locomotive is employed in other types of service than high-speed train service, to haul present day types of standard passenger or freight cars which are provided with brake apparatus adapted to operate on relatively low brake pipe pressure, or to effect relatively low braking ratios, or both. The function of the second reduction limiting reservoir is to so increase the capacity of the reduction limiting reservoir over the sole capacity of the reduction limiting reservoir No. 1 as to insure sufficient reduction in brake pipe pressure to cause a full service application of the brakes on the cars, there being no danger of sliding of the wheels due to the lower braking ratios produced by the brake apparatus on the cars.

As previously explained, I have not shown a retardation controller of the inertia type such as shown and described in the copending application Serial No. 741,063 of Ellis E. Hewitt, but it will be understood that such omission is merely for the sake of simplicity and that in the practical form of the brake control equipment embodying my invention, I intend that such a retardation controller device be employed to automatically reduce brake cylinder pressure for straight-air applications of the brakes to maintain a substantially constant rate of retardation and to prevent sliding of the wheels.

It should also be understood that various other omissions, additions or modifications may be made in the brake control equipment shown and described herein without departing from the spirit of the invention. It is not my intention, therefore, to limit the scope of my invention except as necessitated by the scope of the prior art.

Having now described my invention, what I claim as new and desire to secure by Letters Patent, is:

1. In an automatic train control equipment, the combination of a manually operative brake valve device selectively conditionable to operate to cause application of the brakes by straight-air operation or by automatic operation, application valve means operative to also cause application of the brakes by straight-air operation or by automatic operation depending upon the said brake valve device being conditioned to operate to effect application of the brakes by straight-air or by automatic operation, respectively, and means controlled automatically by track signals for effecting operation of the application valve means.

2. In an automatic train control equipment, in combination, a manually operable brake valve device, means for conditioning said brake valve device for controlling the brakes either by straight-air operation or by automatic operation, an application valve device operative to control the brakes by straight-air operation with the brake valve device conditioned for straight-air operation and by automatic operation with the brake valve device conditioned for automatic operation, and track signal controlled means for effecting the operation of said application valve device.

3. In an automatic train control equipment, the combination of a manually operative brake valve device selectively conditionable to operate to cause application of the brakes by straight-air operation or by automatic operation, application valve means operative, when the said brake valve device is conditioned for operation to effect application of the brakes by straight-air operation, to cause application of the brakes by straight-air operation without operation of the brake valve device, and operative also, when the said brake valve device is conditioned for operation to effect application of the brakes by automatic operation, to cause application of the brakes by automatic operation without operation of the said brake valve device, and means controlled automatically by track signals for effecting operation of the application valve means.

4. In an automatic train control equipment, the combination of a manually operative brake valve device conditionable optionally to operate to effect application of the brakes either by straight-air operation or by automatic operation, application valve means controlled by operation of the brake valve device for effecting application of the brakes by automatic operation, means controlled by the brake valve device for effecting application of the brakes by straight-air operation, and means controlled automatically for effecting operation of the application valve means to effect application of the brakes, said application valve means being effective when operation thereof is effected by said last means for effecting application of the brakes either by straight-air operation or by automatic operation depending upon whether the said brake valve device is conditioned to effect upon operation thereof application of the brakes by straight-air operation or by automatic operation, respectively.

5. In an automatic train control equipment, in combination, a brake pipe, an equalizing discharge valve device operative upon a reduction in fluid pressure for effecting a reduction in brake pipe pressure, a manually operable brake valve device, means for conditioning said brake valve device for operation to control the brakes either by straight-air operation or by effecting a reduction in fluid pressure on said discharge valve device, an application valve device also operative to effect a reduction in fluid pressure on said discharge valve device, and track signal controlled means for controlling the operation of said application valve device.

6. In an automatic train control equipment, in combination, a brake pipe, an equalizing discharge valve device operative upon a reduction in fluid pressure for effecting a reduction in brake pipe pressure, a manually operable brake valve device, means for conditioning said brake valve device for operation to control the brakes either by straight-air operation or by effecting a reduction in fluid pressure on said discharge valve device, an application valve device also operative to effect a reduction in fluid pressure on said discharge valve device, and operative to effect a straight-air application of the brakes with the brake valve device conditioned for straight-air operation, and track signal controlled means for controlling the operation of said application valve device.

7. In an automatic train control equipment, the combination of a manually operative brake valve device conditionable optionally to operate to effect application of the brakes either by straight-air operation or by automatic operation, means controlled by the said brake valve device to cause application of the brakes by straight-air operation, application valve means comprising a brake pipe discharge valve and a valve device, said discharge valve being controlled by said brake valve device to cause application of the brakes by automatic operation, said valve device of the application valve means being operative to also control the said discharge valve to cause application of the brakes by automatic operation when the said brake valve device is conditioned for operation to effect application of the brakes by automatic operation without operation of the brake valve device, said valve device being also operative, when the said brake valve device is conditioned to operate to effect application of the brakes by straight-air operation, to so control the means for causing application of the brakes by straight-air operation as to effect application of the brakes.

8. In an automatic train control equipment, the combination of a manually operative brake valve device selectively conditionable to operate to cause application of the brakes by straight-air operation or by automatic operation, application valve means operative to also cause application of the brakes by straight-air operation or by automatic operation depending upon the said brake valve device being conditioned to operate to effect application of the brakes by straight-air or by automatic operation, respectively, means controlled automatically by track signals for effecting operation of the application valve means, and means for limiting the straight-air application to a certain uniform degree when effected by the application valve means.

9. In an automatic train control equipment, the combination of a manually operative brake valve device selectively conditionable to operate to cause application of the brakes by straight-air operation or by automatic operation, application valve means operative to also cause application of the brakes by straight-air operation or by automatic operation depending upon the said brake valve device being conditioned to operate to effect application of the brakes by straight-air or by automatic operation, respectively, means controlled automatically by track signals for effecting operation of the application valve means, and means for limiting the degree of the automatic application when effected by the application valve means under control of said track signal controlled means.

10. In an automatic train control equipment, the combination of a manually operative brake valve device selectively conditionable to operate to cause application of the brakes by straight-air operation or by automatic operation, application valve means operative to also cause application of the brakes by straight-air operation or by automatic operation depending upon the said brake valve device being conditioned to operate to effect application of the brakes by straight-air or by automatic operation, respectively, means controlled automatically by track signals for effecting operation of the application valve means, means for limiting the straight-air application to a certain uniform degree when effected by the application valve means, and means for limiting the degree of the automatic application when effected by the application valve means.

11. In an automatic train control equipment, the combination of a manually operative brake valve device selectively conditionable to operate to cause application of the brakes by straight-air operation or by automatic operation, application valve means operative to also cause application of the brakes by straight-air operation or by automatic operation depending upon the said brake valve device being conditioned to operate to effect application of the brakes by straight-air or by automatic operation, respectively, means controlled automatically by track signals for effecting operation of the application valve means, and means controlled by the application valve means and effective upon operation of the application valve means to effect application of the brakes, either by straight-air or automatic operation, for causing sanding of the track rails.

12. In a vehicle brake control equipment, the combination of a brake valve device operative manually to effect application of the brakes by straight-air operation, application valve means controlled automatically to also effect application of the brakes by straight-air operation to a degree in excess of a certain predetermined degree, and means effective to prevent operation of said application valve means to effect application of the brakes upon operation of said brake valve device to effect application of the brakes at least to said certain predetermined degree.

13. In an automatic train control equipment, the combination with track signal apparatus on the train, of brake control equipment comprising a brake valve device operative manually to effect application of the brakes by straight-air operation, application valve means operative to also effect application of the brakes by straight-air operation to a degree in excess of a certain predetermined degree, means controlled by the track signal apparatus for initiating operation of the application valve means to effect application of the brakes, and means effective upon operation of said brake valve device to effect application of the brakes at least to said predetermined degree for preventing said application valve means from operating to effect application of the brakes in response to the operation of the track signal controlled means to initiate such operation.

14. In an automatic train control equipment, the combination with brake control equipment including a brake valve device operative under manual control of the operator of the train to effect application of the brakes by straight-air, of fluid pressure responsive application valve means operative upon a reduction in fluid under pressure to cause application of the brakes by straight-air operation without operation of said brake valve device, timing valve mechanism controlled automatically by track signals to cause reduction of pressure on the application valve means, means effective to prevent reduction in pressure on the application valve means by the timing valve mechanism when the brake valve device is operated to effect at least a certain uniform degree of application, and means effective, without operating the brake valve device to effect application of the brakes, to so control said timing valve mechanism as to prevent it from causing reduction in the pressure acting on the application valve means.

15. In an automatic train control equipment, in combination, a manually operable brake valve device selectively conditionable to cause application of the brakes either by straight-air operation or by automatic operation, application valve means operative automatically to cause application of the brakes by straight-air or by automatic operation depending upon the brake valve device being conditioned for effecting application of the brakes by straight-air or by automatic operation, suppression means operative to prevent operation of the application valve means to effect application of the brakes, means operative only upon operation of the brake valve device to effect at least a certain minimum degree of application by straight-air, for effecting operation of the suppression means, and means operative upon operation of the brake valve device to effect at least a second certain minimum degree of application by automatic operation for also causing operation of the suppression means.

16. In an automatic train control equipment, the combination of application valve means operative to effect application of the brakes, means operatively responsive to a variation from the normal track block condition for causing operation of the application valve means to effect application of the brakes a certain uniform interval of time following the occurrence of the variation from the normal track block condition, and means operative independently of variations in speed of the train for varying the length of said interval of time.

17. In an automatic train control equipment, the combination of application valve means operative to effect application of the brakes, means operatively responsive to variation from the normal track block conditions for causing operation of the application valve means to effect application of the brakes, timing means for delaying the operation of the application valve means for a certain interval of time following a variation from the normal track block conditions, and means operative from one position in which the timing means is effective to a second position for rendering said timing means ineffective to delay the operation of the application valve means following a variation from the normal track block condition.

18. In an automatic train control equipment, the combination of an application valve means operative to effect application of the brakes, means operatively responsive to a variation from the normal track block condition to effect operation of the application valve means a certain uniform interval of time after the condition of the track blocks varies, manually operative means having a normal position and operative to a different position to prevent operation of said last means to cause operation of the application valve means to effect application of the brakes, despite a variation from the normal track block condition, timing means for rendering the manually operative means ineffective upon the elapse of a certain uniform interval of time following operation to the said different position, unless said manually operative means is operated to its normal position and back to said different position within the said interval of time, and means for varying the interval of time within which the said manually operative means must be operated from the different position thereof to its normal position and back to the different position in order to remain preventively effective.

19. In an automatic train control equipment, the combination of application valve means operative to effect application of the brakes, means operatively responsive to variation from the normal track block conditions for causing operation of the application valve means to effect application of the brakes, timing means for delaying the operation of the application valve means for a certain interval of time following a variation from the normal track block conditions, manually operable means effective when operated from a normal position to a second position within the said certain interval of time for preventing operation of the application valve means to effect application of the brakes, a second timing means effective to render said manually operable means preventively ineffective upon the elapse of a second certain uniform interval of time unless operated within such interval of time to the normal position and back to the second position, and means operative from one position, in which both said timing means are effective, to a second position for rendering the first said timing means ineffective and for varying the time interval effected by the second timing means.

20. In an automatic train control equipment, the combination of application valve means operative to effect application of the brakes, means operatively responsive to a variation from the normal track block condition for causing operation of the application valve means to effect application of the brakes upon the elapse of a certain uniform interval of time following the occurrence of the variation in the track block condition, manually operable means effective when operated within the said certain interval of time for preventing said last means from operating to cause operation of the application valve means, means effective only upon the occurrence of a variation from the normal track block condition for rendering the said manually operable means preventively effective, and means controlling said last means for causing it to render the manually operable means preventively effective at any time.

21. In a brake control equipment, the combination with a brake pipe and an equalizing reservoir normally charged with fluid under pressure, an equalizing discharge valve device operative upon a reduction in equalizing reservoir pressure to effect a corresponding reduction in brake pipe pressure, and means operative upon a reduction in brake pipe pressure to effect application of the brakes, of means for effecting a reduction in equalizing reservoir pressure, a plurality of reduction limiting reservoirs, for receiving the fluid vented from the equalizing reservoir, and manually operative means for selectively rendering one or more of said reservoirs effective at any time to receive the fluid vented from the equalizing reservoir, whereby to vary the amount of the reduction to which the pressure in the equalizing reservoir is limited.

22. A brake control equipment for a train made up of a locomotive and different groups of cars at different times, the cars of one group having brake equipment for applying the brakes thereon at a braking ratio different from the braking ratio of another group, comprising a brake pipe and an equalizing reservoir both normally charged with fluid under pressure, means for effecting a reduction of equalizing reservoir pressure, an equalizing discharge valve device operative upon a reduction in equalizing reservoir pressure for effecting a corresponding reduction in brake pipe pressure, means operatively responsive to a reduction of brake pipe pressure for effecting application of the train brakes, and manually controlled means for limiting the reduction of equalizing reservoir pressure to different maximum amounts depending upon the braking ratio of the particular group of cars in the train.

23. A brake control equipment for a train made up of a locomotive and different groups of cars at different times, the cars of one group having brake equipment for applying the brakes thereon at a braking ratio different from the braking ratio of another group, comprising a brake pipe and an equalizing reservoir both normally charged with fluid under pressure, means for effecting a reduction of equalizing reservoir pressure, an equalizing discharge valve device operative upon a reduction in equalizing reservoir pressure for effecting a corresponding reduction in brake pipe pressure, means operatively responsive to a reduction of brake pipe pressure for effecting application of the train brakes, a plurality of reduction limiting reservoirs, and manually controlled means for varying the number of reservoirs in use for varying the maximum amount of reduction of equalizing reservoir pressure depending upon the braking ratio of the particular group of cars in the train.

24. In an automatic train control equipment, in combination, electro-magnetic means effective automatically upon the occurrence of an unfavorable traffic condition to cause an application of the brakes after the elapse of a certain uniform length of time following the occurrence of the unfavorable traffic condition, manually operative means having a normal position and operative to a different position to prevent said electro-magnetic means from operating to effect an application of the brakes, and means for rendering said manually operative means ineffective if it remains in said different position longer than a second certain length of time and effective indefinitely if it is operated repeatedly from said different position to said normal position and back to said different position within successive intervals of time shorter in duration than said second length of time.

25. In an automatic train control equipment, in combination, electro-magnetic means effective automatically to cause an application of the brakes upon the elapse of a certain uniform length of time following the occurrence of an unfavorable traffic condition, a fluid-pressure-operated switch device effective when subjected to fluid pressure within said certain length of time for controlling said electro-magnetic means to prevent its operation to effect application of the brakes, a reservoir, manually operative valve means having a normal position in which it effects charging of said reservoir with fluid under pressure and a second position in which it establishes communication through which said fluid-pressure-operated switch device is subjected to the pressure in said reservoir, a timing vent through which fluid under pressure is released from said fluid-pressure operated switch to render it ineffective in a second certain length of time, said manually operated valve means being effective when operated from its said second position to its said normal position and back to its said section position within said second certain length of time to effect recharge of said reservoir and thereby to maintain the fluid pressure on the fluid-pressure-operated switch device so as to render the fluid-pressure-operated switch device effective for a time longer than said second certain length of time.

THOMAS W. MASTERMAN.